(12) United States Patent
Liu

(10) Patent No.: US 12,296,267 B2
(45) Date of Patent: May 13, 2025

(54) METHOD AND APPARATUS FOR OPERATING VIRTUAL PROP IN VIRTUAL ENVIRONMENT, DEVICE AND READABLE MEDIUM

(71) Applicant: Tencent Technology (Shenzhen) Company Limited, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/243,022

(22) Filed: Sep. 6, 2023

(65) Prior Publication Data

US 2023/0405466 A1    Dec. 21, 2023

Related U.S. Application Data

(63) Continuation of application No. 17/591,460, filed on Feb. 2, 2022, now Pat. No. 11,786,817, which is a
(Continued)

(30) Foreign Application Priority Data

Jan. 15, 2020    (CN) .......................... 202010042540.1

(51) Int. Cl.
A63F 13/57    (2014.01)

(52) U.S. Cl.
CPC .................................. *A63F 13/57* (2014.09)

(58) Field of Classification Search
CPC .......... A63F 13/52; A63F 13/56; A63F 13/57; A63F 13/577; A63F 13/833; A63F 13/837; A63F 2300/8082
See application file for complete search history.

(56) References Cited

U.S. PATENT DOCUMENTS

| | | | |
|---|---|---|---|
| 7,841,943 B2 | 11/2010 | Nomura | |
| 11,656,755 B2 * | 5/2023 | Pan .......................... | A63F 13/55 715/769 |

(Continued)

FOREIGN PATENT DOCUMENTS

| | | |
|---|---|---|
| CN | 108367199 A | 8/2018 |
| CN | 108970112 A | 12/2018 |

(Continued)

OTHER PUBLICATIONS

"How to Set the Sliding Shovel in the Call of Duty Mobile Game", Oct. 14, 2019, 2 pgs., Retrieved from the Internet: http://www.3h3.com/codm/10883.html.

(Continued)

*Primary Examiner* — David L Lewis
*Assistant Examiner* — Matthew D Hoel
(74) *Attorney, Agent, or Firm* — Morgan, Lewis & Bockius LLP

(57) ABSTRACT

This application discloses a method for operating a virtual prop in a virtual environment performed by a computer device. The method includes: displaying a virtual environment interface, the virtual environment interface comprising a picture of the virtual environment observed by a first virtual object, the first virtual object being equipped with a first prop; in response to a predefined trigger operation on the first virtual object, controlling the first virtual object to perform an attack on a second virtual object in the virtual environment by using the first prop; and in response to successful execution of the attack on the second virtual object, controlling the first virtual object to perform a display action in the virtual environment, the display action representing a result of the attack on the second virtual object.

14 Claims, 12 Drawing Sheets

Related U.S. Application Data continuation of application No. PCT/CN2020/123547, filed on Oct. 26, 2020.

(56) References Cited

U.S. PATENT DOCUMENTS

| | | | |
|---|---|---|---|
| 11,786,817 B2 | 10/2023 | Liu | |
| 2004/0229695 A1* | 11/2004 | Hussaini | A63F 13/24 463/38 |
| 2005/0026695 A1* | 2/2005 | Tsuchiyama | A63F 13/30 463/42 |
| 2005/0166159 A1* | 7/2005 | Mondry | G06F 3/0486 715/769 |
| 2007/0150834 A1* | 6/2007 | Muller | G06F 3/0486 715/810 |
| 2007/0173334 A1* | 7/2007 | Whitby | A63F 13/98 463/47 |
| 2007/0265081 A1* | 11/2007 | Shimura | A63F 13/426 463/37 |
| 2011/0265041 A1* | 10/2011 | Ganetakos | A63F 13/533 715/834 |
| 2013/0079140 A1 | 3/2013 | Watkins, Jr. et al. | |
| 2013/0290884 A1* | 10/2013 | Sotoike | A63F 13/42 715/765 |
| 2017/0291106 A1 | 10/2017 | Rom et al. | |
| 2017/0340977 A1* | 11/2017 | Guthridge | A63F 13/795 |
| 2018/0050265 A1 | 2/2018 | Wada et al. | |
| 2022/0152501 A1* | 5/2022 | Liu | A63F 13/58 |

FOREIGN PATENT DOCUMENTS

| | | |
|---|---|---|
| CN | 109847369 A | 6/2019 |
| CN | 110201391 A | 9/2019 |
| CN | 110354489 A | 10/2019 |
| CN | 110585695 A | 12/2019 |
| CN | 111249726 A | 6/2020 |

OTHER PUBLICATIONS

Tencent Technology, ISRWO, PCT/CN2020/123547, Jan. 27, 2021, 7 pgs.

Tencent Technology, IPRP, PCT/CN2020/123547, Jul. 19, 2022, 6 pgs.

"Warframe Parkour Tips", Jan. 8, 2018, 3 pgs., Retrieved from the Internet: https://jingyan.baidu.com/article/ff411625e5512e12e5823764.html.

Tencent Technology, Singaporean ISR/WO, SG Patent Application No. 11202203951R, Nov. 27, 2024, 11 pgs.

YouTube.com., Nooblets, "WARFRAME Full Movement Tutorial Guide + Key Control Display", Jul. 2013, Retrieved from the Internet: https://www.youtube.corn/watch?v=QsrXU0MeFG4.

YouTube.com, SteelSeries, "Improve your Aim & Movement in Warframe", May 2019, Retrieved from the Internet: https://www.youtube.com/watch?v=AGp-L6Eloac.

\* cited by examiner

METHOD AND APPARATUS FOR OPERATING VIRTUAL PROP IN VIRTUAL ENVIRONMENT, DEVICE AND READABLE MEDIUM

CROSS-REFERENCE TO RELATED APPLICATIONS

This application is a continuation application of U.S. patent application Ser. No. 17/591,460, entitled "METHOD AND APPARATUS FOR OPERATING VIRTUAL PROP IN VIRTUAL ENVIRONMENT. DEVICE, AND READABLE MEDIUM" filed on Feb. 2, 2022, which is a continuation application of PCT Patent Application No. PCT/CN2020/123547, entitled "METHOD AND APPARATUS FOR OPERATING VIRTUAL PROP IN VIRTUAL ENVIRONMENT, DEVICE, AND READABLE MEDIUM" filed on Oct. 26, 2020, which claims priority to Chinese Patent Application No. 202010042540.1, filed with the State Intellectual Property Office of the People's Republic of China on Jan. 15, 2020, and entitled "METHOD AND APPARATUS FOR OPERATING VIRTUAL PROP IN VIRTUAL ENVIRONMENT, DEVICE AND READABLE MEDIUM", all of which are incorporated herein by reference in their entirety.

FIELD OF THE TECHNOLOGY

Embodiments of this application relate to the field of virtual environments, and in particular, to a method and an apparatus for operating a virtual prop in a virtual environment, a device and a readable medium.

BACKGROUND OF THE DISCLOSURE

In an application program including a virtual environment, a virtual object in the virtual environment usually needs to be controlled to move in the virtual environment, for example, walk, drive, swim, fight, or pick up an item, where the virtual object in the virtual environment can operate the virtual prop to realize a combat process. However, the solution of using virtual props by virtual objects provided in the related art has a relatively complex human-computer interaction process.

SUMMARY

Embodiments of this application provide a method and an apparatus for operating a virtual prop in a virtual environment, a device and a readable medium, which can improve attack efficiency of a first virtual object using a first prop. The technical solutions are as follows:

According to one aspect, a method for operating a virtual prop in a virtual environment is performed by a computer device, the method including:
  displaying a virtual environment interface, the virtual environment interface including a picture of the virtual environment observed by a first virtual object, the first virtual object being associated with a first prop, the first prop being a close-in attack prop;
  receiving a sliding tackle state trigger operation and in response to the sliding tackle state trigger operation, controlling the first virtual object to be in a sliding tackle state in the virtual environment, the sliding tackle state being used for indicating a state in which the first virtual object is sliding forward in the virtual environment in a tilted crouching position;
  receiving an attack operation while the first virtual object is in the sliding tackle state; and
  controlling the first virtual object to perform a close-in attack by using the first prop in the sliding tackle state according to the attack operation.

In another aspect, an apparatus for operating a virtual prop in a virtual environment is provided, including:
  a display module, configured to display a virtual environment interface, the virtual environment interface including a picture of the virtual environment observed by a first virtual object, the first virtual object being associated with a first prop, the first prop being a close-in attack prop;
  a receiving module, configured to receive a sliding tackle state trigger operation and control the first virtual object to be in a sliding tackle state in the virtual environment, the sliding tackle state being used for indicating a state in which the first virtual object is sliding forward in the virtual environment in a tilted crouching position;
  the receiving module being further configured to receive an attack operation while the first virtual object is in the sliding tackle state; and
  a control module, configured to control the first virtual object to perform a close-in attack by using the first prop in the sliding tackle state according to the attack operation.

In still another aspect, a computer device is provided, including a processor and a memory, the memory storing at least one program, the at least one program being loaded and executed by the processor to cause the computer device to implement the operation for a virtual prop in a virtual environment according to any one of the foregoing embodiments of this application.

In yet another aspect, a non-transitory computer-readable storage medium is provided, storing at least one program, the at least one program being loaded and executed by a processor of a computer device to cause the computer device to implement the operation for a virtual prop in a virtual environment according to the any one of the foregoing embodiments of this application.

In still yet another aspect, a computer program product is provided, the computer program product, when run on a computer, causing the computer to perform the operation for a virtual prop in a virtual environment according to any one of the embodiments of this application.

The technical solutions provided in the embodiments of this application include at least the following beneficial effects:
  When the first prop is applied, first, the first virtual object is controlled to be in a sliding tackle state and makes an attack with the first prop in the sliding tackle state. Because the body position of the first virtual object in the sliding tackle state is relatively close to the ground compared with the body position in a normal standing or walking state, when the first prop is swung, the height of a swing path of the first prop is more consistent with the height of the virtual object, and other virtual objects cannot directly evade the attack of the first prop, which improves the attack efficiency of the first virtual object using the first prop, thus improving the human-computer interaction efficiency of the first virtual object during the attack with the first prop.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person skilled in the art may still derive other accompanying drawings from these accompanying drawings without creative efforts.

DESCRIPTION OF EMBODIMENTS

Figure 1:
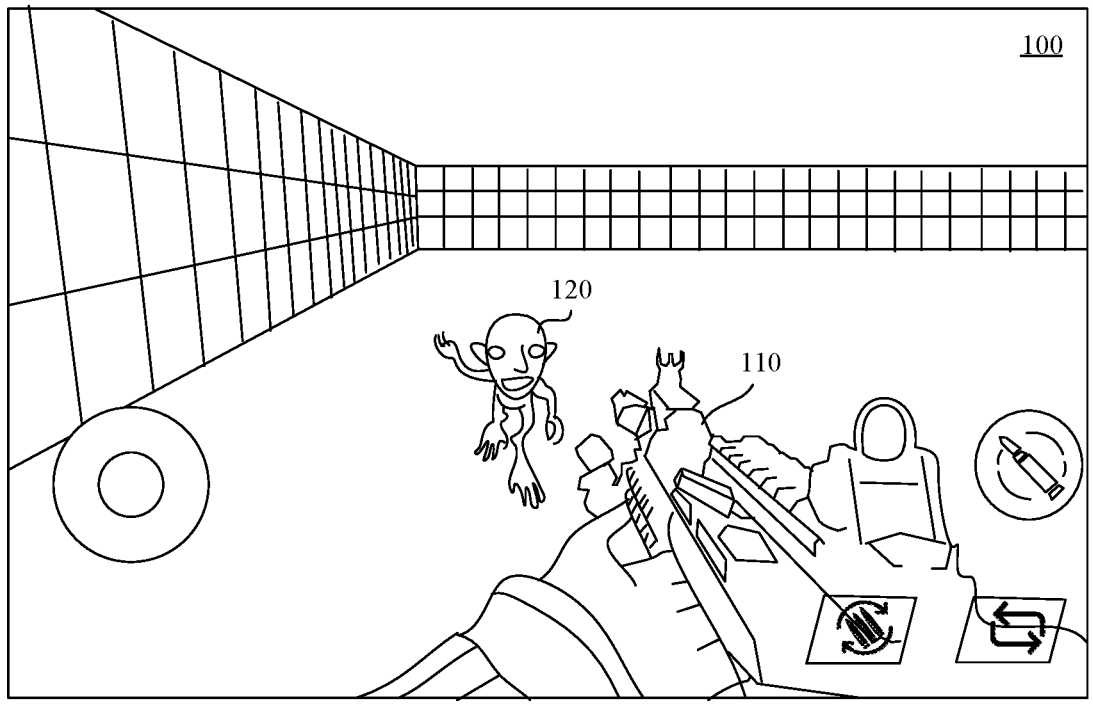
FIG. 1 is a schematic diagram of an attack on a hostile virtual object by using a long-distance attack prop according to an exemplary embodiment of this application.

To make objectives, technical solutions, and advantages of this application clearer, the following further describes implementations of this application in detail with reference to the accompanying drawings.

First, terms involved in the embodiments of this application are briefly introduced:

A virtual environment is a virtual environment displayed (or provided) by an application program when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional virtual environment. This is not limited in this application. A description is made by using an example in which the virtual environment is a three-dimensional virtual environment in the following embodiments.

A virtual object is a movable object in the virtual environment. The movable object may be a virtual character, a virtual animal, a cartoon character, or the like, such as a character, an animal, a plant, an oil drum, a wall, a stone, or the like displayed in a three-dimensional virtual environment. In some embodiments, the virtual object is a three-dimensional model created based on a skeletal animation technology. Each virtual object has a shape and size in the three-dimensional virtual environment, and occupies some space in the three-dimensional virtual environment. In some embodiments, virtual objects are divided into target virtual objects and hostile virtual objects in the embodiment of this application, where the target virtual object is a virtual object currently controlled by a player, and the hostile virtual object is a virtual object that launches an attack on the target virtual object. The attack launched by the hostile virtual object on the target virtual object can be spontaneous, i.e., when the target virtual object appears within a visual range of the hostile virtual object, the hostile virtual object launches an attack on the target virtual object; or the attack launched by the hostile virtual object on the target virtual object can be passive, i.e., after the target virtual object attacks the hostile virtual object, the hostile virtual object launches an attack on the target virtual object based on the attack received. In some embodiments, the hostile virtual object may be an Artificial Intelligence (AI) attack object provided by the system, or may be a virtual object controlled by another player.

An attack prop is a prop held by a virtual object for attacking other virtual objects in a virtual environment, where the other virtual objects may be virtual objects hostile to the target virtual object, or may include both virtual objects hostile to the target virtual object and virtual objects that are teammate of the target virtual object. In some embodiments, the attack prop can be classified as a long-distance attack prop or a close-in attack prop. The long-distance attack prop is a prop that realizes an attack process by firing a missile, where the missile may be fired by the prop, such as a virtual gun, a virtual bow and arrow, or the like, or the missile may be the attack prop itself, such as a stone, a sandbag, or the like. The close-in attack prop is a prop that is controlled directly by the virtual object in a swing manner so as to realize an attack process, such as a virtual knife, a virtual stick, a virtual axe, a virtual pan, or the like.

In the related art, the virtual object can apply a virtual prop picked up in the virtual environment to fight or apply a virtual prop assembled at the beginning of the game to fight. For example, at the beginning of a virtual game, each virtual object is assembled with a virtual knife, and in the virtual game, the virtual object attacks other virtual objects by swinging the virtual knife.

However, in the foregoing application process of virtual props, because the application manners of the virtual props are known, it is easier to evade the attack process of the virtual props, for example, evading an attack range of the virtual knife. As a result, a virtual object needs to make a plurality of attacks to eliminate another virtual object, for example, swinging the knife several times and adjusting the position to attack another virtual object. The human-computer interaction process is relatively complex.

Figure 2:
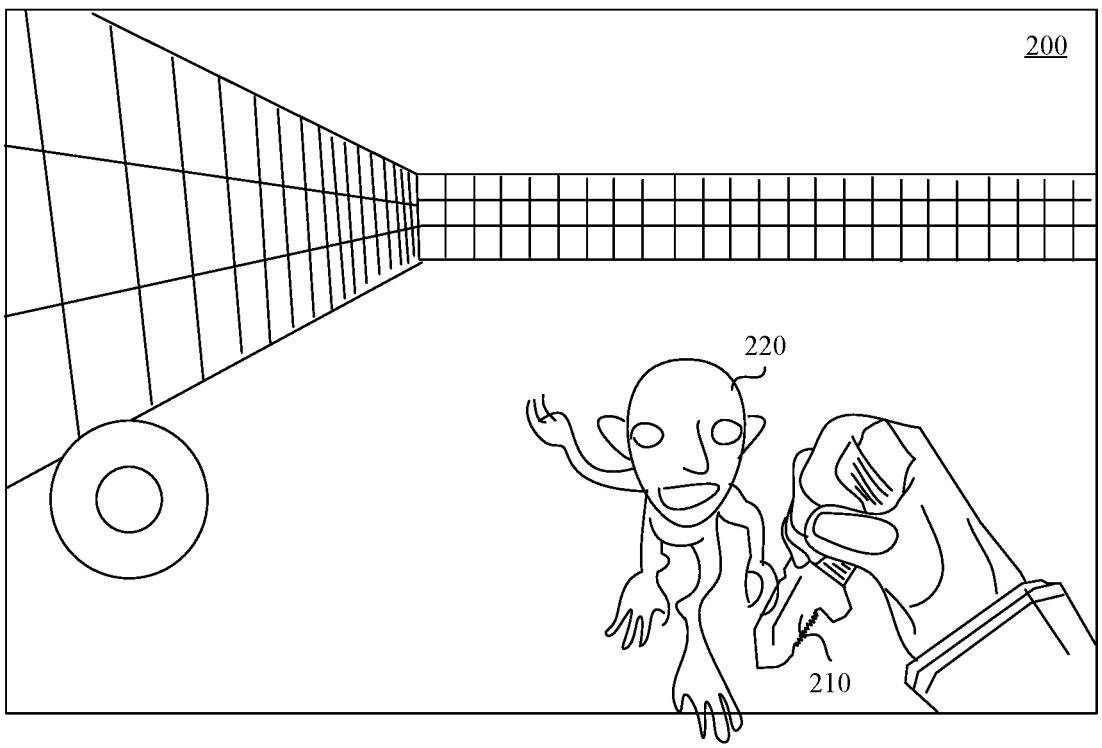
FIG. 2 is a schematic diagram of an attack on a hostile virtual object by using a close-in attack prop according to an exemplary embodiment of this application.

Schematically, the long-distance attack prop and the close-in attack prop are illustrated respectively, as shown in FIG. 1 and FIG. 2.

FIG. 1 is a schematic diagram of an attack on a hostile virtual object using a long-distance attack prop according to an exemplary embodiment of this application, where the virtual environment interface 100 includes a virtual firearm 110 and a hostile virtual object 120. The virtual environment interface 100 is a picture of the virtual environment interface observed from a first-person perspective of the virtual object, and the virtual object controls the virtual firearm 110 to aim at the hostile virtual object 120 for firing, thereby realizing a long-distance attack on the hostile virtual object 120.

FIG. 2 is a schematic diagram of an attack on a hostile virtual object using a close-in attack prop according to an exemplary embodiment of this application, where the virtual environment interface 200 includes a virtual prop 210 and a hostile virtual object 220. The virtual environment interface 100 is a picture of the virtual environment interface observed from a first-person perspective of the virtual object. The virtual prop 210 is a close-in attack prop, and because the hostile virtual object 220 is close to the virtual object, the virtual object is able to control the virtual prop 210 to swing, thus making a close-in attack on the hostile virtual object 220.

Sliding tackle is used for representing a manner in which the first virtual object is sliding forward in the virtual environment in a tilted crouching position. In some embodiments, the tilted crouching is a posture in which the virtual object is tilted backwards in the virtual environment, with both legs positioned at different distances in front of the body for support. In some embodiments, in the sliding tackle state, the forward speed of the virtual object is faster than the normal walking speed, and optionally, in the sliding tackle state, the forward speed of the virtual object is faster than the normal running speed.

The method provided in this application may be applied to a virtual reality (VR) application program, a 3D map program, a military simulation program, a first-person shooting game (FPS), a third-person shooting game (TPS), and a multiplayer online battle arena game (MOBA), and the like. An application during a game is used as an example for description in the following embodiments.

A game based on a virtual environment is usually formed by maps of one or more game worlds. The virtual environment in the game simulates scenarios in the real world. A user may control a virtual object in the game to perform actions in the virtual environment, such as walking, running, jumping, shooting, fighting, driving, switching a virtual weapon in use, and attacking other virtual objects with a virtual weapon, which has relatively high interactivity. In addition, a plurality of users may form a team online to play an arena game. When the user controls the virtual object to launch an attack on the first virtual object by using a virtual weapon, the user selects a suitable virtual weapon to attack the virtual object according to the location of the first virtual object, or an operating habit. The virtual weapon includes at least one of a firearm weapon, a melee weapon, and a throwing weapon, where the firearm weapon includes a rifle, a sniper rifle, a pistol, a shotgun, and other types of firearms, the melee weapon includes at least one of a dagger, a knife, an axe, a sword, a stick, and a pot (for example, a pan), and the throwing weapon includes an ordinary grenade, a sticky grenade, a flashbang, a smoke grenade, and the like.

A terminal in this application may be a desktop computer, a portable laptop computer, a mobile phone, a tablet computer, an ebook reader, a Moving Picture Experts Group Audio Layer III (MP3) player, a Moving Picture Experts Group Audio Layer IV (MP4) player, or the like. An application program supporting a virtual environment is installed and run on the terminal, such as an application program supporting a three-dimensional virtual environment. The application program may be any one of a virtual reality application program, a three-dimensional map program, a military simulation program, a TPS game, an FPS game, or a MOBA game. In some embodiments, the application program may be a standalone application program, such as a standalone 3D game application program, or may be a network online application program.

Figure 3:
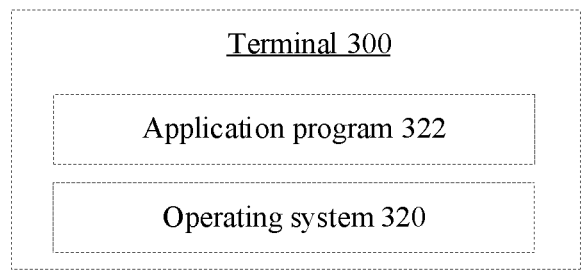
FIG. 3 is a structural block diagram of a terminal according to an exemplary embodiment of this application.

FIG. 3 shows a structural block diagram of an electronic device according to an exemplary embodiment of this application. The electronic device 300 includes an operating system 320 and an application program 322.

The operating system 320 is basic software provided for the application program 322 to perform secure access to computer hardware.

The application program 322 is an application program supporting a virtual environment. In some embodiments, the application program 322 is an application program supporting a three-dimensional virtual environment. The application program 322 may be any one of a VR application program, a three-dimensional map program, a military simulated program, a TPS game, an FPS game, a MOBA game, and a multi-player shootout survival game. The application program 322 may be a standalone application program, such as a standalone 3D game program.

Figure 4:
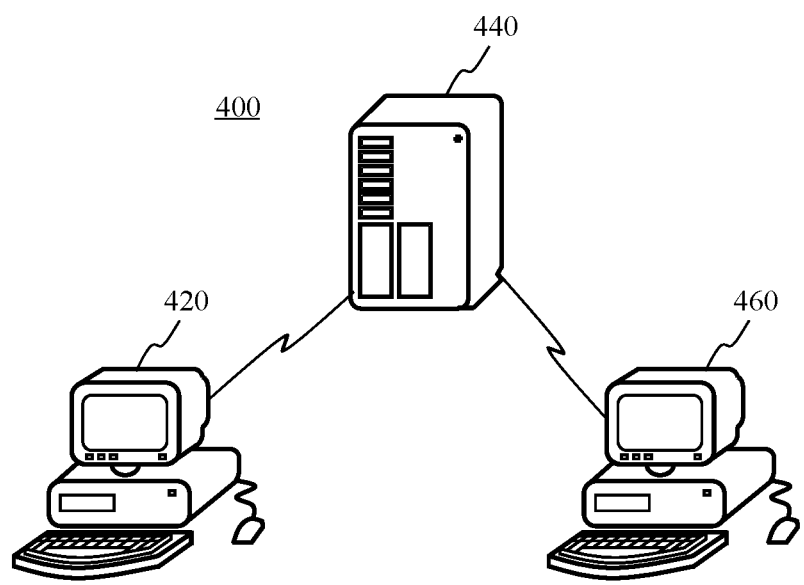
FIG. 4 is a schematic diagram of an implementation environment according to an exemplary embodiment of this application.

FIG. 4 shows a structural block diagram of a computer system according to an exemplary embodiment of this application. The computer system 400 includes a first device 420, a server 440, and a second device 460.

An application program supporting a virtual environment is installed and run on the first device 420. The application program may be any one of a VR application program, a three-dimensional map program, a military simulation program, a TPS game, an FPS game, a MOBA game, and a multiplayer shooting survival game. The first device 420 is a device used by a first user, the first user uses the first device 420 to control a first virtual object in the virtual environment to perform a movement, and the movement includes, but is not limited to, at least one of body posture adjustment, crawling, walking, running, cycling, jumping, driving, picking, shooting, attacking, and throwing. Schematically, the first virtual object is a first virtual character such as a simulated character role or a cartoon character role.

The first device 420 is connected to the server 440 through a wireless network or a wired network.

The server 440 includes at least one of one server, a plurality of servers, a cloud computing platform, and a virtualization center. The server 440 is configured to provide a backend service for an application program supporting a three-dimensional virtual environment. In some embodiments, the server 440 takes on primary computing work, the first device 420 and the second device 460 take on secondary computing work; alternatively, the server 440 takes on secondary computing work, and the first device 420 and the second device 460 take on the primary computing work;

alternatively, collaborative computing is performed by using a distributed computing architecture among the server 440, the first device 420, and the second device 460.

An application program supporting a virtual environment is installed and run on the second device 460. The application program may be any one of a virtual reality application, a three-dimensional map application, a military simulation application, an FPS game, a MOBA game, and a multiplayer shooting survival game. The second device 460 is a device used by a second user, the second user uses the second device 460 to control a second virtual object in the virtual environment to perform a movement, and the movement includes, but is not limited to, at least one of body posture adjustment, crawling, walking, running, cycling, jumping, driving, picking, shooting, attacking, and throwing. Schematically, the second virtual object is a second virtual character, such as a simulated character role or a cartoon character role.

In some embodiments, the first virtual character and the second virtual character are located in a same virtual environment. In some embodiments, the first virtual character and the second virtual character may belong to a same team or a same organization, have a friend relationship, or have a temporary communication permission. In some embodiments, the first virtual character and the second virtual character may alternatively belong to different teams, different organizations, or two groups hostile to each other.

In some embodiments, the application programs installed on the first device 420 and the second device 460 are the same, or the application programs installed on the two devices are the same type of application programs of different control system platforms. The first device 420 may generally refer to one of a plurality of devices, the second device 460 may generally refer to one of a plurality of devices. In this embodiment, description is made by using only the first device 420 and the second device 460 as an example. The type of the first device 420 and the type of the second device 460 may be the same or may be different. The device type includes at least one of a game console, a desktop computer, a smartphone, a tablet computer, an ebook reader, an MP3 player, an MP4 player, and a laptop computer. In the following embodiments, a description is made by using an example in which the device is a desktop computer.

A person skilled in the art may learn that there may be more or fewer devices. For example, there may be only one device, or there may be dozens of or hundreds of or more devices. The quantity and the device type of the device are not limited in the embodiments of this application.

Figure 5:
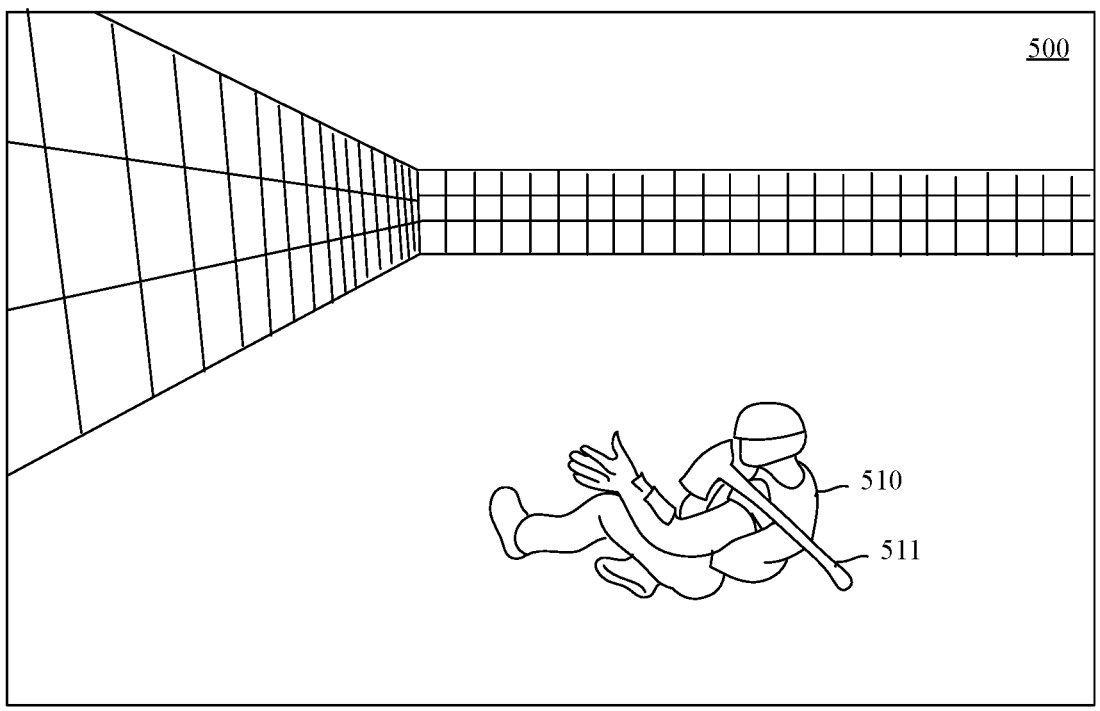
FIG. 5 is a schematic diagram of a user interface of a method for operating a virtual prop according to an embodiment of this application.

The embodiments of this application provide a method for operating a virtual prop in a virtual environment. FIG. 5 is a schematic diagram of a user interface of a method for operating a virtual prop according to an embodiment of this application. The virtual prop being a virtual axe is used as an example for description. As shown in FIG. 5:

A virtual object 510 is displayed in a virtual environment interface 500. First, the virtual object 510 is triggered to move forward in the virtual environment in a sliding tackle state. In some embodiments, the virtual object 510 holds a virtual axe 511, which is used for attacking other virtual objects in the virtual environment. When the virtual object 510 is in the sliding tackle state and receives an attack operation, the virtual object 510 swings the virtual axe 511 in the sliding tackle state to make an attack in the virtual environment.

Figure 6:
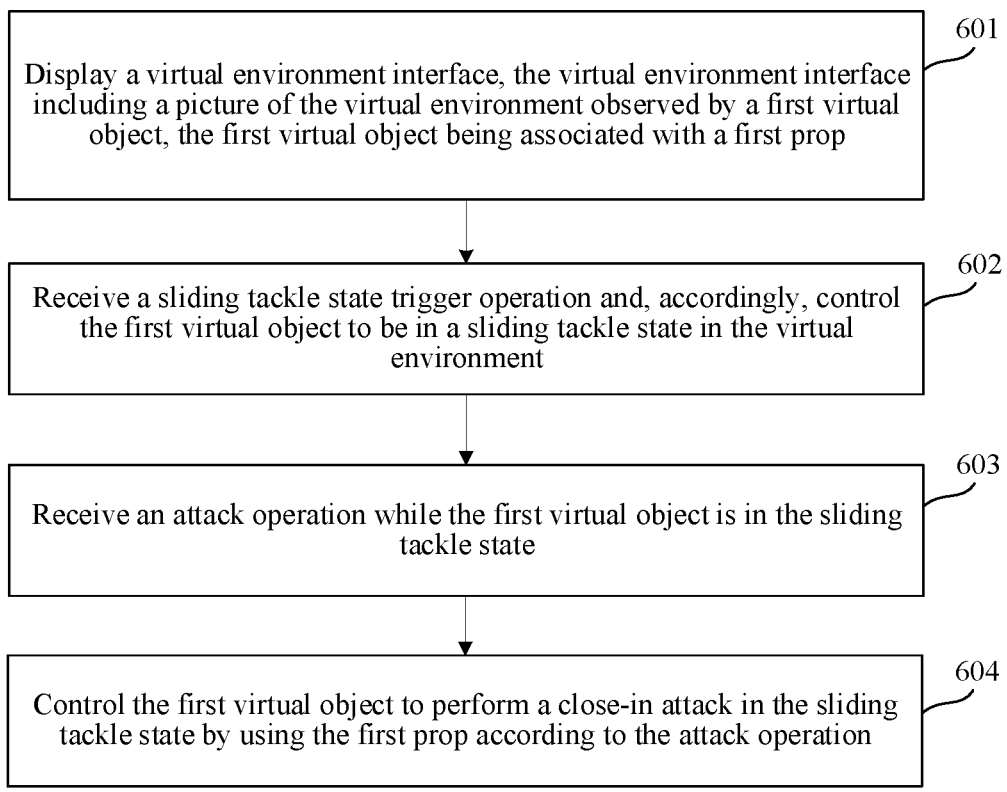
FIG. 6 is a flowchart of a method for operating a virtual prop in a virtual environment according to an exemplary embodiment of this application.

With reference to the foregoing description of the terms and the implementation environment, a method for operating a virtual prop in a virtual environment according to an embodiment of this application is described. FIG. 6 is a flowchart of a method for operating a virtual prop in a virtual environment according to an exemplary embodiment of this application. The method being applied to a terminal is used as an example for description. As shown in FIG. 6, the method includes:

Step 601: Display a virtual environment interface, the virtual environment interface including a picture of the virtual environment observed by a first virtual object, the first virtual object being associated with a first prop.

In some embodiments, the first prop is a close-in attack prop. In some embodiments, the first prop is a prop that the first virtual object is currently holding, or the first prop may be a prop that the first virtual object is carrying but not holding. In this embodiment, schematically, the first prop being a virtual axe is used as an example for illustration. The virtual axe is a prop assembled by the first virtual object before the virtual game begins; or, the virtual axe is a prop picked up by the first virtual object in the virtual environment; or, the virtual axe is a prop obtained by the first virtual object by way of exchange in the virtual game. In the embodiment of this application, the virtual axe being a prop assembled for the first virtual object before the virtual game begins is used as an example for illustration.

In some embodiments, before the virtual game begins, a prop assembly interface is displayed. The prop assembly interface includes candidate props, and the candidate props include the first prop and a second prop. The second prop is a default prop assembled for the first virtual object. The first prop has a larger attack range than that of the second prop. An assembly operation of the first prop is received on the prop assembly interface, the assembly operation being used for assembling the first prop for the first virtual object.

In some embodiments, the first prop is a prop obtained by way of resource exchange in the game.

Figure 7:
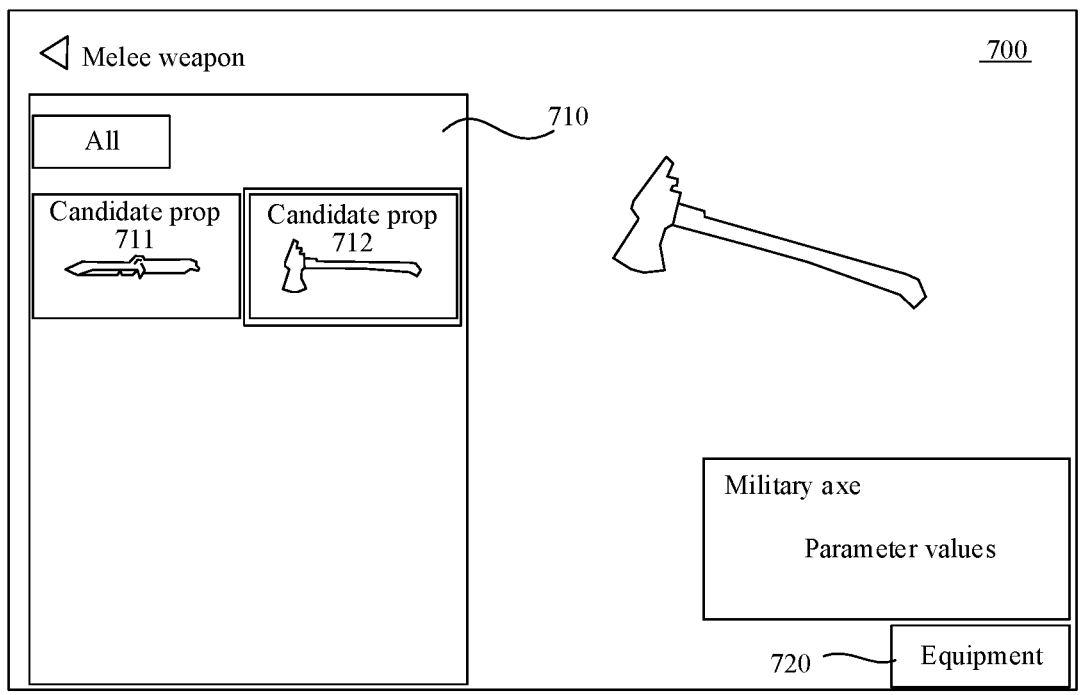
FIG. 7 is a schematic diagram of an interface of a prop assembling process according to the embodiment shown in FIG. 6.

Schematically, referring to FIG. 7, a candidate prop selection area 710 is displayed in a prop assembly interface 700, which includes a candidate prop 711 and a candidate prop 712. The candidate prop 711 is a prop assembled for the first virtual object by default, and the candidate prop 712 is a prop acquired by a player in the game by way of purchase. After the candidate prop 712 is selected, a profile of the candidate prop 712 is displayed in the prop assembly interface 700, and after the assembly control 720 is selected, the assembly operation of the candidate prop 712 is realized, i.e., the ability to apply the candidate prop 712 in a virtual battle is provided to the first virtual object.

It is worth mentioning that, in the above embodiment, the first prop being a close-in attack prop is used as an example. In an actual operation, the first prop may alternatively be a long-distance attack prop, such as a virtual gun, a virtual magic wand, or the like. In this embodiment, the first prop being a virtual axe is used as an example for illustration.

In some embodiments, the screen in the virtual environment interface may be a picture of the virtual environment observed from a first-person perspective of the first virtual object, or a picture of the virtual environment observed from a third-person perspective of the first virtual object.

Step 602: Receive a sliding tackle state trigger operation and in response to the sliding tackle state trigger operation, control the first virtual object to be in a sliding tackle state in the virtual environment.

In some embodiments, the sliding tackle state is used for indicating a state in which the first virtual object is sliding forward in the virtual environment in a tilted crouching position. In some embodiments, the tilted crouching is a posture in which the first virtual object is tilted backwards in the virtual environment, with both legs positioned at different distances in front of the body for support. In some embodiments, in the sliding tackle state, the forward speed of the virtual object is faster than the normal walking speed, and optionally, in the sliding tackle state, the forward speed of the virtual object is faster than the normal running speed.

In some embodiments, single duration of the first virtual object being in the sliding tackle state in the virtual environment includes at least one of the following cases:

In the first case, the single duration of the first virtual object being in the sliding tackle state corresponds to a duration limit, and when the duration reaches the duration limit, the state of the first virtual object is automatically restored to the state before the sliding tackle state. For example, the first virtual object first enters a continuous running state and switches to the sliding tackle state, and when the sliding tackle state reaches the duration limit, the state of the first virtual object is automatically restored to the continuous running state;

In the second case, the single duration of the first virtual object being in the sliding tackle state corresponds to a duration limit, and when the duration reaches the duration limit, the state of the first virtual object is automatically restored to a preset state, such as a standing state;

In the third case, the single duration of the first virtual object being in the sliding tackle state is determined according to a control operation of the sliding tackle state, and when the control operation ends, the state of the first virtual object is automatically restored to the state before the sliding tackle state. For example, the first virtual object first enters a continuous running state and when a long press operation on a crouch control is received, the first virtual object is controlled to switch to the sliding tackle state; when the long press operation ends, the state of the first virtual object is automatically restored to the continuous running state.

In the fourth case, the single duration of the first virtual object being in the sliding tackle state is determined according to the control operation of the sliding tackle state, and when the control operation ends, the state of the first virtual object is automatically restored to a preset state, such as a standing state.

Figure 8:
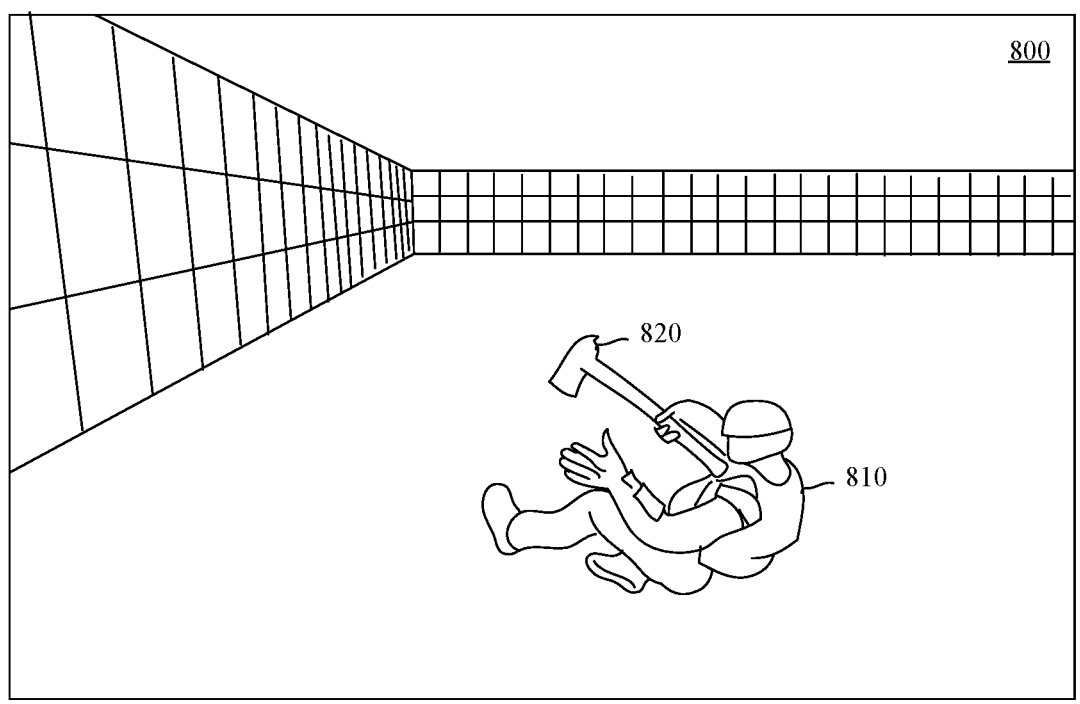
FIG. 8 is a schematic diagram of an interface when a first virtual object is in a sliding tackle state according to the embodiment shown in FIG. 6.

In some embodiments, in this embodiment of this application, the first virtual object entering the sliding tackle state while holding the first prop and the first prop being a virtual axe is used as an example for description. Schematically, referring to FIG. 8, a virtual environment interface 800 includes a first virtual object 810, and the first virtual object 810 holds a virtual axe 820 with a hand. When receiving the sliding tackle state trigger operation, the first virtual object 810 is in the sliding tackle state while holding the virtual axe 820 in the virtual environment.

Step 603: Receive an attack operation while the first virtual object is in the sliding tackle state.

In some embodiments, the attack operation controls the first virtual object in any one of the following manners:

In the first manner, the first virtual object holds a first prop, and when receiving an attack operation, makes an attack through the prop currently held by the first virtual object.

In the second manner, the first virtual object holds other props, and when the first virtual object is in the sliding tackle state and receives an attack operation, the first virtual object switches to the first prop for attacking by default. Schematically, the first prop is a virtual axe carried on the shoulder of the first virtual object, and when receiving an attack operation, the first virtual object switches the virtual axe from the back to the hand and makes an attack by using the virtual axe.

Step 604: Control the first virtual object to perform a close-in attack in the sliding tackle state by using the first prop according to the attack operation.

In some embodiments, the first virtual object slides forward in the sliding tackle state and swings the first prop to perform a close-in attack while sliding, and when other virtual objects are on a swing path of the first prop, the other virtual objects are attacked by the first prop.

Schematically, the virtual environment also includes a second virtual object. A collision detection box is mounted on the first prop, and a collision detection is performed between the first prop and the second virtual object by using the collision detection box. It is determined, in response to the existence of a collision between the collision detection box and the second virtual object, that the first prop causes a damage value to the second virtual object.

Figure 9:
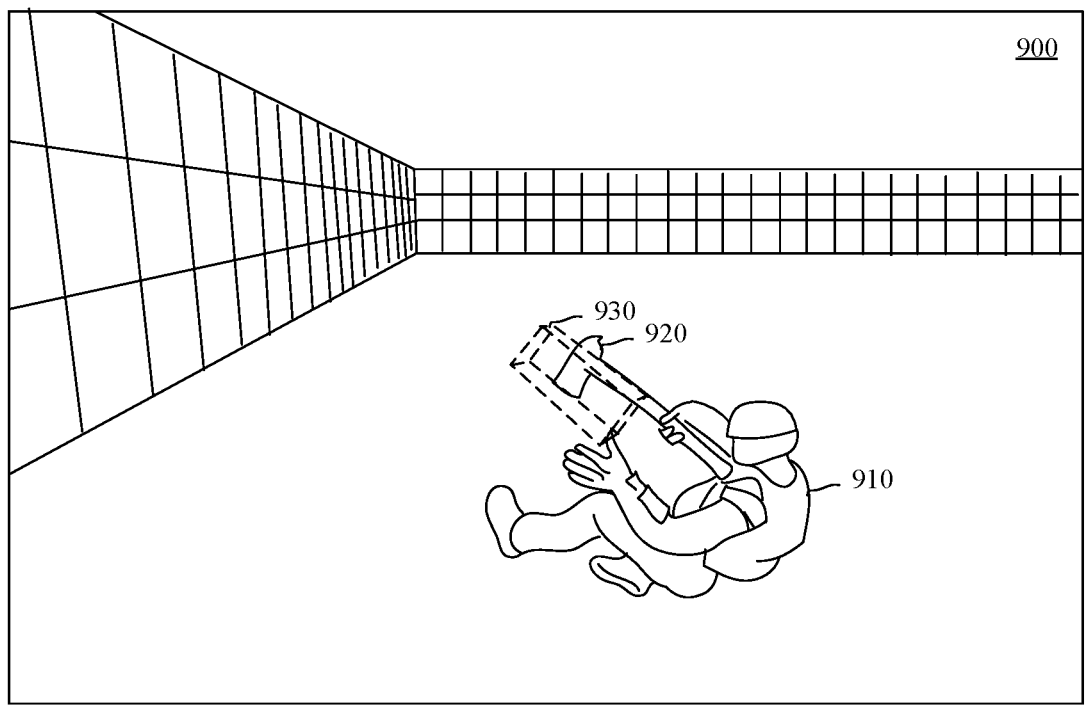
FIG. 9 is a schematic diagram of a collision detection box corresponding to a first prop according to the embodiment shown in FIG. 6.

Schematically, referring to FIG. 9, the virtual environment interface 900 includes a first virtual object 910, and the first virtual object 910 holds a virtual axe 920 with a hand. During the sliding tackle process, the first virtual object 910 swings the virtual axe 920 to perform a close-in attack. A swing path of the virtual axe 920 corresponds to a movement path of the collision detection box 930, and any virtual object having a collision with the collision detection box 930 is attacked by the virtual axe 920. In some embodiments, when the attacked virtual object is a hostile virtual object of the first virtual object 910, the virtual axe 920 generates a damage value to the attacked virtual object.

In conclusion, in the method for operating a virtual prop in a virtual environment provided by this embodiment, when the first prop is applied, first, the first virtual object is controlled to be in a sliding tackle state and makes an attack with the first prop in the sliding tackle state. Because the body position of the first virtual object in the sliding tackle state is relatively close to the ground compared with the body position in a normal standing or walking state, when the first prop is swung, the height of a swing path of the first prop is more consistent with the height of the virtual object, and other virtual objects cannot directly evade the attack of the first prop, which improves the attack efficiency of the first virtual object using the first prop, thus improving the human-computer interaction efficiency of the first virtual object during the attack with the first prop.

Figure 10:
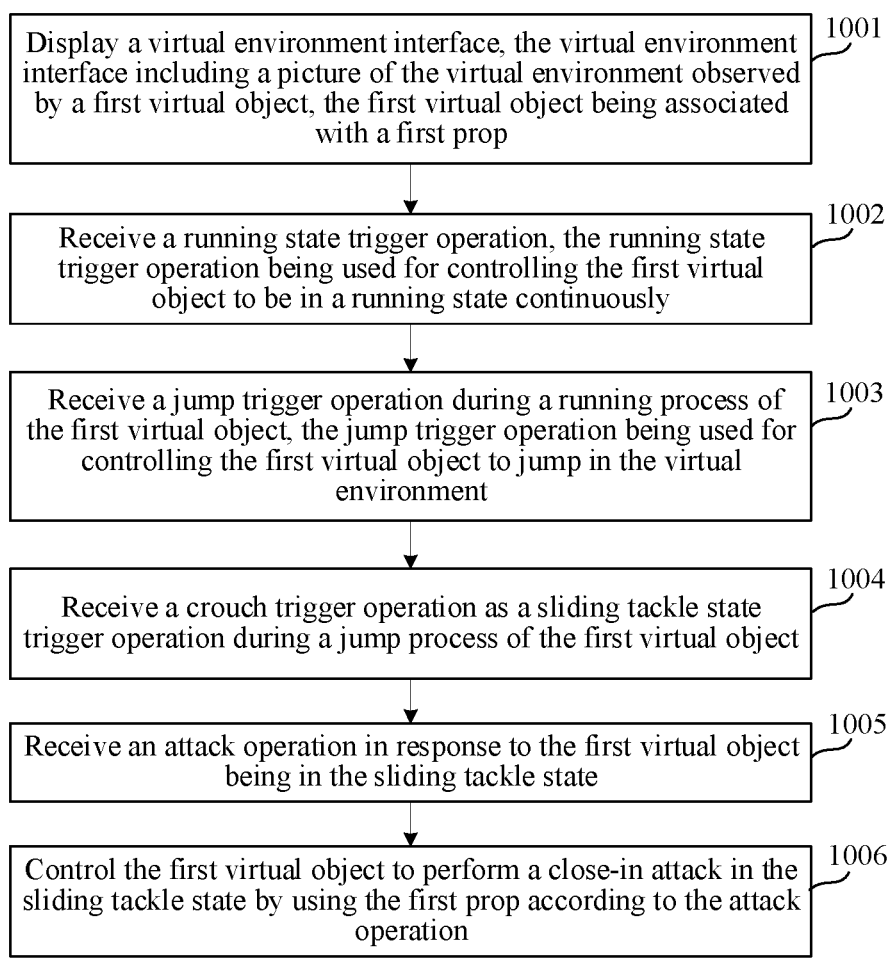
FIG. 10 is a flowchart of a method for operating a virtual prop in a virtual environment according to another exemplary embodiment of this application.

In some embodiments, the trigger operation of the sliding tackle state is achieved by a combination of processes such as continuous running, jumping, or the like. FIG. 10 is a flowchart of a method for operating a virtual prop in a virtual environment according to another exemplary embodiment of this application. For example, the method is applied to a terminal. As shown in FIG. 10, the method includes:

Step 1001: Display a virtual environment interface, the virtual environment interface including a picture of the virtual environment observed by a first virtual object, the first virtual object being associated with a first prop.

In this embodiment, schematically, the first prop being a virtual axe is used as an example for illustration. The virtual axe is a prop assembled by the first virtual object before the virtual game begins; or, the virtual axe is a prop picked up by the first virtual object in the virtual environment; or, the virtual axe is a prop obtained by the first virtual object by way of exchange in the virtual game. In the embodiment of this application, the virtual axe being a prop assembled for the first virtual object before the virtual game begins is used as an example for illustration.

Step 1002: Receive a running state trigger operation, the running state trigger operation being used for controlling the first virtual object to be in a running state continuously.

In some embodiments, the running state trigger operation is used for controlling the first virtual object to remain in the running state even if the terminal does not receive any control operation. In some embodiments, the running state trigger operation includes any one of the following cases:

In the first case, the virtual environment interface includes a continuous running control. After a trigger operation on the continuous running control is received, the first virtual object is controlled to continuously run forward in the current direction.

In the second case, the virtual environment interface includes a forward rocker control. The first virtual object is controlled to advance in the virtual environment when the forward rocker control is dragged by a predetermined distance in a target direction, and the first virtual object is controlled to run continuously in the virtual environment along the direction of the rocker when the forward rocker control is dragged to a target position in the target direction.

Step 1003: Receive a jump trigger operation during a running process of the first virtual object, the jump trigger operation being used for controlling the first virtual object to jump in the virtual environment.

In some embodiments, the virtual environment interface includes a jump control. The first virtual object is controlled to jump in the virtual environment when a trigger operation on the jump control is received.

Step 1004: Receive a crouch trigger operation as a sliding tackle state trigger operation during a jump process of the first virtual object.

In some embodiments, the crouch trigger operation is used for controlling the first virtual object to crouch in the virtual environment.

In some embodiments, the jump process includes a takeoff stage, a falling stage and a landing stage, where the takeoff stage is used for indicating a stage when the first virtual object starts jumping from the ground until it reaches the highest point of the jump; the falling stage is used for indicating a stage when the first virtual object starts falling from the highest point until it touches the ground; the landing stage is used for indicating a stage when the first virtual object touches the ground in the falling process until the jump is completed. In some embodiments, the crouch trigger operation is received and used as the sliding tackle state trigger operation during the landing stage of the jump process.

Figure 11:
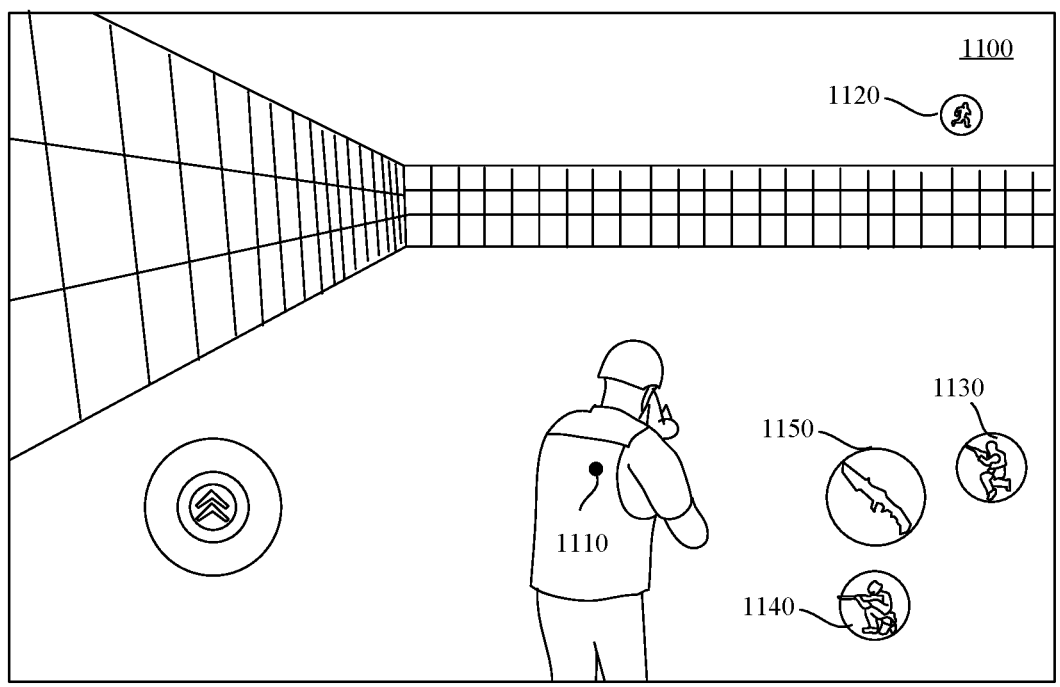
FIG. 11 is a schematic diagram of a trigger process of a sliding tackle state according to the embodiment shown in FIG. 10.

Schematically, referring to FIG. 11, the virtual environment interface 1100 includes a first virtual object 1110, a continuous running control 1120, a jump control 1130, a crouch control 1140, and an attack control 1150. First, after a click on the continuous running control 1120, the first virtual object 1110 is controlled to be in a continuous running state in the virtual environment. During a running process of the first virtual object 1110, the jump control 1130 is clicked to control the first virtual object 1110 to jump in the virtual environment. The crouch control 1140 is clicked at the moment of landing of the first virtual object 1110, thereby triggering the first virtual object 1110 to be in a sliding tackle state.

Step 1005: Receive an attack operation while the first virtual object is in the sliding tackle state.

In some embodiments, the attack operation controls the first virtual object in any one of the following manners:

In the first manner, the first virtual object holds a first prop, and when receiving an attack operation, makes an attack through the prop currently held by the first virtual object.

In the second manner, the first virtual object holds another prop, and when the first virtual object is in the sliding tackle state and receives an attack operation, the first virtual object switches to the first prop to make an attack by default.

Step 1006: Control the first virtual object to perform a close-in attack in the sliding tackle state by using the first prop according to the attack operation.

In some embodiments, the first virtual object slides forward in the sliding tackle state and swings the first prop to perform a close-in attack while sliding, and when other virtual objects are on a swing path of the first prop, the other virtual objects are attacked by the first prop.

In conclusion, in the method for operating a virtual prop in a virtual environment provided by this embodiment, when the first prop is applied, first, the first virtual object is controlled to be in a sliding tackle state and makes an attack with the first prop in the sliding tackle state. Because the body position of the first virtual object in the sliding tackle state is relatively close to the ground compared with the body position in a normal standing or walking state, when the first prop is swung, the height of a swing path of the first prop is more consistent with the height of the virtual object, and other virtual objects cannot directly evade the attack of the first prop, thus improving the human-computer interaction efficiency of the first virtual object during the attack with the first prop.

In the method provided in this embodiment, the first virtual object is controlled to be in a continuous running state in the virtual environment, and the first virtual object is triggered to jump during the running process, thus controlling the first virtual object to enter the sliding tackle state in the virtual environment, simulating the entire process of running, jumping and sliding tackle in the sliding tackle process, and making the sliding tackle state more real.

Figure 12:
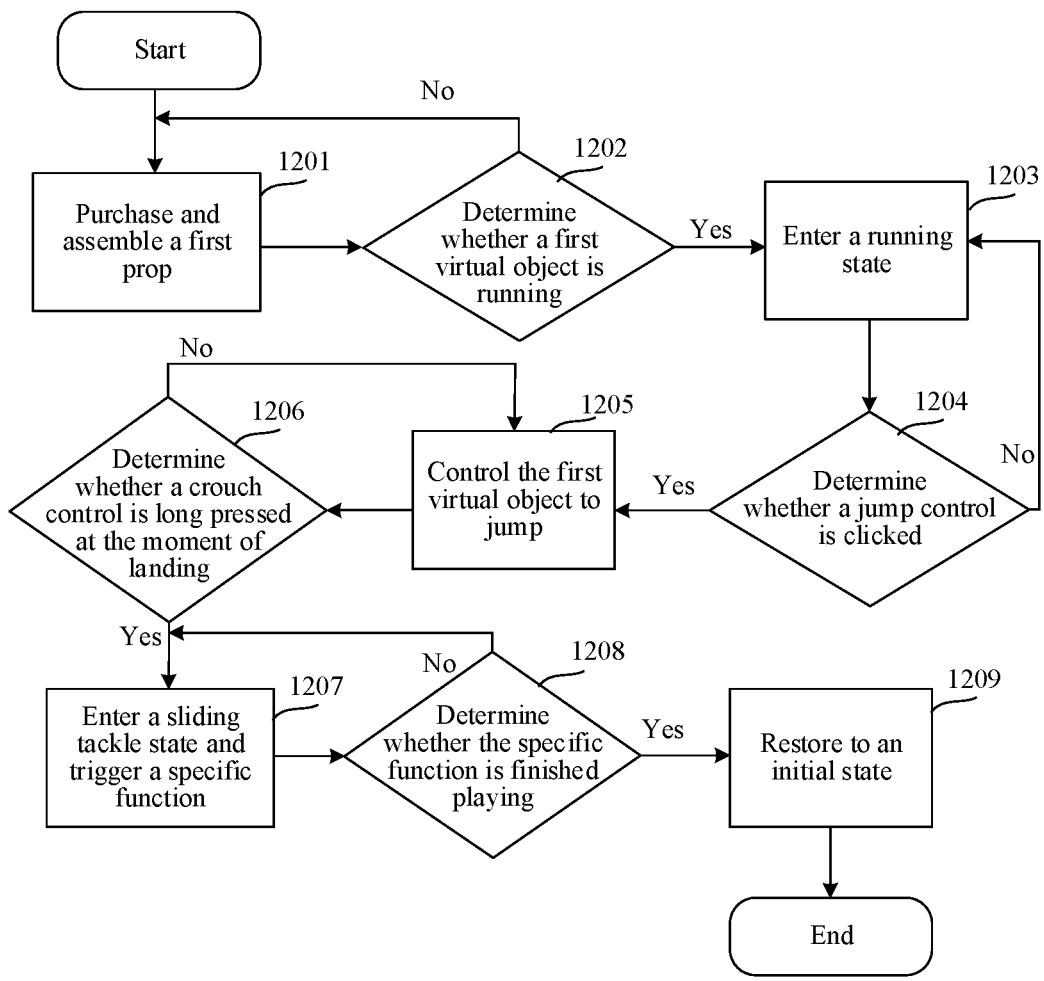
FIG. 12 is a schematic diagram of a trigger process of a sliding tackle state according to an exemplary embodiment of this application.

Schematically, FIG. 12 is a schematic diagram of a trigger process of a sliding tackle state according to an exemplary embodiment of this application. As shown in FIG. 12, the process of triggering the sliding tackle of the first virtual object includes the following steps:

Step 1201: Purchase and equip a first prop.

In some embodiments, the first prop is a prop purchased by a player in a game and assembled in a prop assembly interface.

Step 1202: Determine whether the first virtual object is running.

In some embodiments, it is determined whether the first virtual object is in a continuous running state, the continuous running state being used for boosting the sliding tackle state of the first virtual object.

Step 1203: Enter a running state when the first virtual object is running.

Step 1204: Determine whether a jump control is clicked.

In some embodiments, when the jump control is clicked, the first virtual object jumps during the continuous running process.

Step 1205: Control the first virtual object to jump when the jump control is clicked.

Step 1206: Determine whether a crouch control is long pressed at the moment of landing.

In some embodiments, the jump process includes a takeoff stage, a falling stage and a landing stage, where the takeoff stage is used for indicating a stage when the first virtual object starts jumping from the ground until it reaches the highest point of the jump; the falling stage is used for indicating a stage when the first virtual object starts falling from the highest point until it touches the ground; the landing stage is used for indicating a stage when the first virtual object touches the ground in the falling process until the jump is completed. In some embodiments, the crouch trigger operation is received and used as a sliding tackle state trigger operation during the landing stage of the jump process.

Step 1207: Enter a sliding tackle state and trigger a specific function when the crouch control is long pressed.

In some embodiments, the specific function may be triggering the first virtual object to perform a specific action in the virtual environment.

Step 1208: Determine whether the specific function is finished playing.

Step 1209: Restore to an initial state when the specific function finishes playing.

Figure 13:
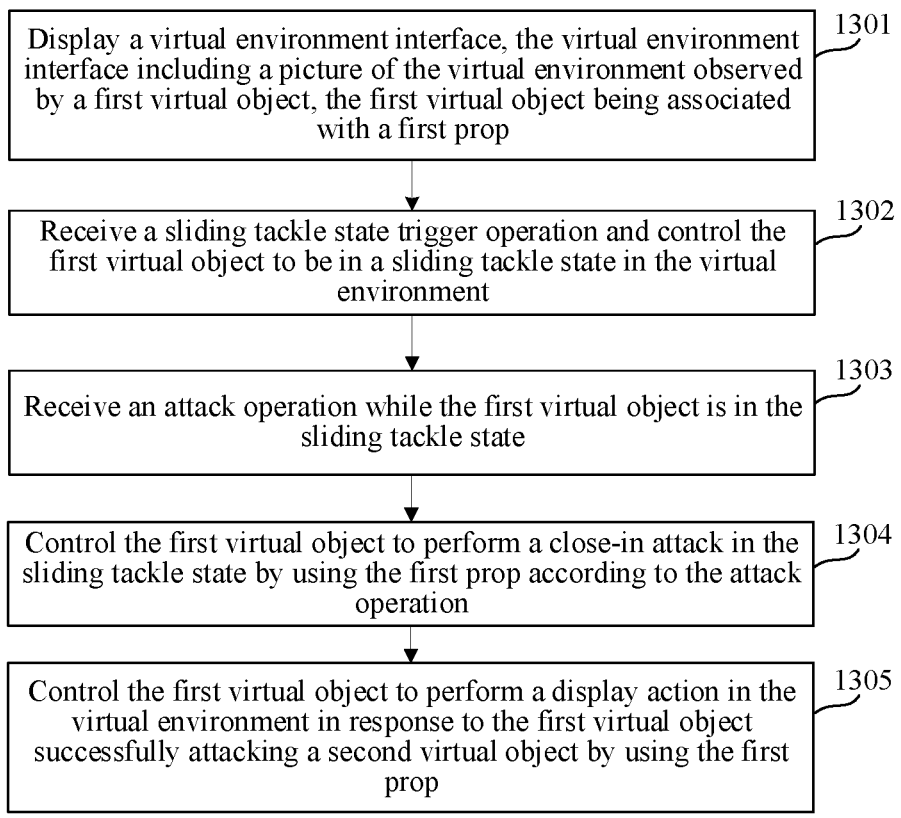
FIG. 13 is a flowchart of a method for operating a virtual prop in a virtual environment according to another exemplary embodiment of this application.

In some embodiments, the virtual environment further includes a second virtual object. The first virtual object is controlled to perform a display action when the first virtual object successfully attacks the second virtual object. FIG. 13 is a flowchart of a method for operating a virtual prop in a virtual environment according to another exemplary embodiment of this application. The method being applied to a terminal is used as an example for description. As shown in FIG. 13, the method includes the following steps:

Step 1301: Display a virtual environment interface, the virtual environment interface including a picture of the virtual environment observed by a first virtual object, the first virtual object being associated with a first prop.

In this embodiment, schematically, the first prop being a virtual axe is used as an example for illustration. The virtual axe is a prop assembled by the first virtual object before the virtual game begins; or, the virtual axe is a prop picked up by the first virtual object in the virtual environment; or, the virtual axe is a prop obtained by the first virtual object by way of exchange in the virtual game. In the embodiment of this application, the virtual axe being a prop assembled for the first virtual object before the virtual game begins is used as an example for illustration.

Step 1302: Receive a sliding tackle state trigger operation and control the first virtual object to be in a sliding tackle state in the virtual environment.

In some embodiments, the sliding tackle state is used for indicating a state in which the first virtual object is sliding forward in the virtual environment in a tilted crouching position. In some embodiments, the tilted crouching is a posture in which the first virtual object is tilted backwards in the virtual environment, with both legs positioned at different distances in front of the body for support.

Step 1303: Receive an attack operation while the first virtual object is in the sliding tackle state.

In some embodiments, the attack operation controls the first virtual object in any one of the following manners:

In the first manner, the first virtual object holds a first prop, and when receiving an attack operation, makes an attack through the prop currently held by the first virtual object.

In the second manner, the first virtual object holds another prop, and when the first virtual object is in the sliding tackle state and receives an attack operation, the first virtual object switches to the first prop to make an attack by default.

Step 1304: Control the first virtual object to perform a close-in attack in the sliding tackle state by using the first prop according to the attack operation.

In some embodiments, the first virtual object slides forward in the sliding tackle state and swings the first prop to perform a close-in attack while sliding, and when other virtual objects are on a swing path of the first prop, the other virtual objects are attacked by the first prop.

Step 1305: Control the first virtual object to perform a display action in the virtual environment in response to the first virtual object successfully attacking a second virtual object by using the first prop.

In some embodiments, the display action is used for indicating a result of the attack made by the first virtual object on the second virtual object, that is, indicating that the attack is successful when the first virtual object attacks the second virtual object.

In some embodiments, the successful attack made by the first virtual object on the second virtual object includes any one of the following manners:

In the first manner, the first virtual object is controlled to perform the display action in the virtual environment in response to the first virtual object generating a damage value to the second virtual object by using the first prop.

In some embodiments, a collision detection box is mounted on the first prop, and a collision detection is performed between the first prop and the second virtual object by using the collision detection box, and it is determined that the first prop causes a damage value to the second virtual object when a collision exists between the collision detection box and the second virtual object.

In the second manner, the first virtual object is controlled to perform the display action in the virtual environment in response to the first virtual object eliminating the second virtual object by using the first prop.

In some embodiments, when a life point value of the second virtual object is reduced to 0 after the first virtual object attacks the second virtual object through the first prop, it is determined that the first virtual object eliminates the second virtual object by using the first prop.

Figure 14:
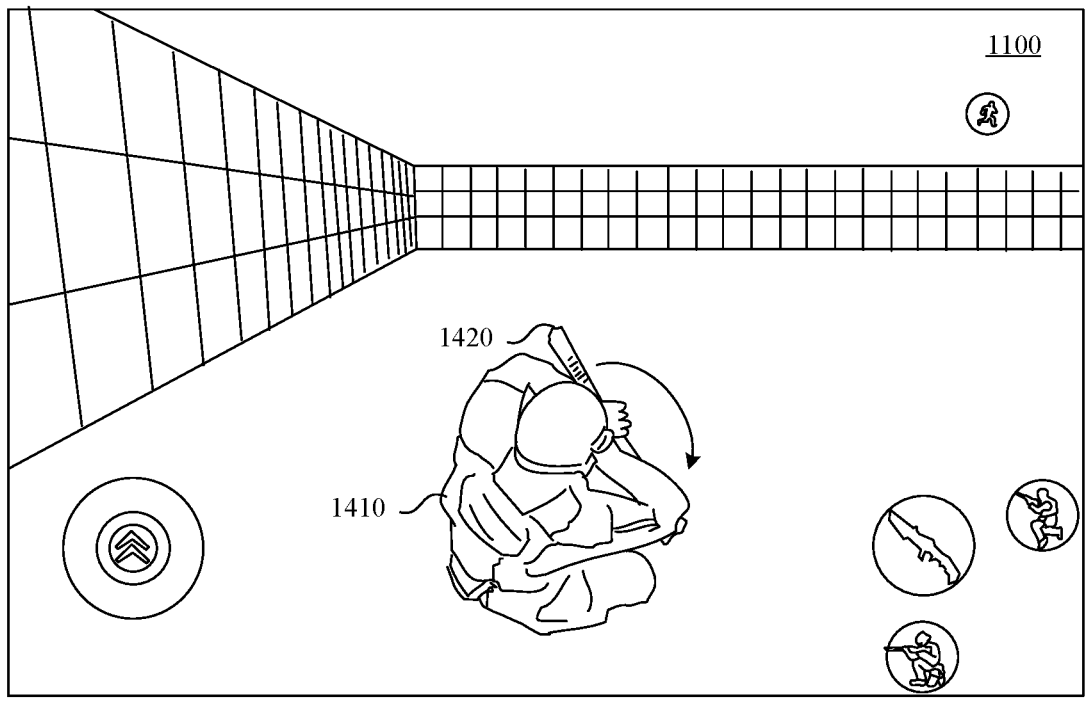
FIG. 14 is a schematic diagram of an interface of a display action according to the embodiment shown in FIG. 13.

In some embodiments, the display action can be a custom action, or a preset action, or a random action, which is not limited in the embodiments of this application. Schematically, referring to FIG. 14, the virtual environment interface 1400 includes a first virtual object 1410, the first virtual object 1410 holding the first prop 1420 in its hand. When the first virtual object 1410 successfully attacks the second virtual object through the first prop 1420 during the sliding tackle process, the first virtual object 1410 rotates the handheld first prop 1420 as a display action after the successful attack.

In conclusion, in the method for operating a virtual prop in a virtual environment provided by this embodiment, when the first prop is applied, first, the first virtual object is controlled to be in a sliding tackle state and makes an attack with the first prop in the sliding tackle state. Because the body position of the first virtual object in the sliding tackle state is relatively close to the ground compared with the body position in a normal standing or walking state, when the first prop is swung, the height of a swing path of the first prop is more consistent with the height of the virtual object, and other virtual objects cannot directly evade the attack of the first prop, which improves the attack efficiency of the first virtual object using the first prop, thus improving the human-computer interaction efficiency of the first virtual object during the attack with the first prop.

In the method provided by this embodiment, the first virtual object is controlled to perform the display action when the first virtual object successfully attacks the second virtual object through the first prop in the sliding tackle process. The state of the second virtual object cannot be directly obtained because in the sliding tackle process, the first virtual object usually has slid from one side of the second virtual object to the other side after attacking the second virtual object. Through the display action, whether the second virtual object is attacked or not can be determined, avoiding rotation of the viewpoint for observation, and improving the efficiency of human-computer interaction efficiency.

Figure 15:
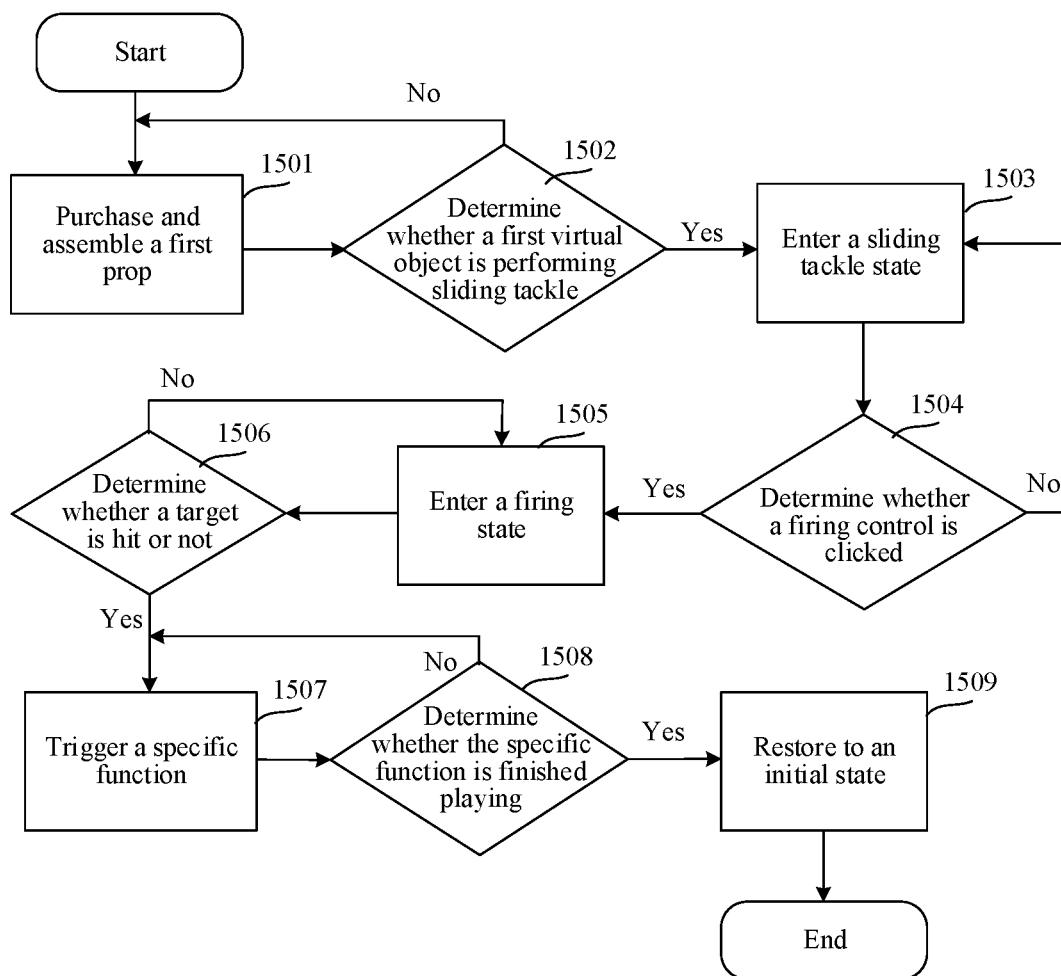
FIG. 15 is a flowchart of an attack on a target during a sliding tackle process according to an exemplary embodiment of this application.

FIG. 15 is a flowchart of an attack on a target during a sliding tackle process according to an exemplary embodiment of this application, the process includes:

Step 1501: Purchase and assemble a first prop.

In some embodiments, the first prop is a prop purchased by a player in a game and assembled in a prop assembly interface.

Step 1502: Determine whether a first virtual object is performing sliding tackle.

In some embodiments, determine whether the first virtual object is in a sliding tackle state after continuously running, jumping, and a long press crouching.

Step 1503: Enter a sliding tackle state when the first virtual object is performing sliding tackle.

Step 1504: Determine whether click to a fire control.

In some embodiments, the first virtual object attacks through the first prop when the fire control is clicked.

Step 1505: Enter a firing state when the fire control is clicked.

In some embodiments, the first prop is a close-in attack prop. Therefore, when the fire control is clicked, the first virtual object is controlled to swing the first prop to make an attack.

Step 1506: Determine whether a target is hit or not.

In some embodiments, a collision detection box is mounted on the first prop, and whether the target is hit or not is determined by detecting a collision between the collision detection box and the target.

Step 1507: Trigger a specific function when the target is hit.

In some embodiments, the specific function may be to trigger the first virtual object to perform a specific action in the virtual environment.

Step 1508: Determine whether the specific function finishes playing.

Step 1509: Restore to an initial state when the specific function finishes playing.

In conclusion, in the method for operating a virtual prop in a virtual environment provided by this embodiment, when the first prop is applied, first, the first virtual object is controlled to be in a sliding tackle state and makes an attack with the first prop in the sliding tackle state. Because the body position of the first virtual object in the sliding tackle state is relatively close to the ground compared with the body position in a normal standing or walking state, when the first prop is swung, the height of a swing path of the first prop is more consistent with the height of the virtual object, and other virtual objects cannot directly evade the attack of the first prop, which improves the attack efficiency of the first virtual object using the first prop, thus improving the human-computer interaction efficiency of the first virtual object during the attack with the first prop.

Figure 16:
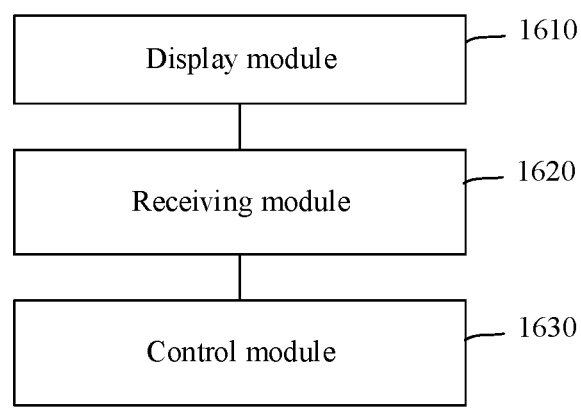
FIG. 16 is a structural block diagram of an apparatus for operating a virtual prop in a virtual environment according to an exemplary embodiment of this application.

FIG. 16 is a structural block diagram of an apparatus for operating a virtual prop in a virtual environment according to an exemplary embodiment of this application. Descriptions are provided by using an example in which the apparatus is applied to a terminal. As shown in FIG. 16, the apparatus includes a display module 1610, a receiving module 1620, and a controlling module 1630.

The display module 1610 is configured to display a virtual environment interface, the virtual environment interface including a picture of the virtual environment observed by a first virtual object, the first virtual object being associated with a first prop, the first prop being a close-in attack prop;

The receiving module 1620 is configured to receive a sliding tackle state trigger operation and control the first virtual object to be in a sliding tackle state in the virtual environment, the sliding tackle state being used for indicating a state in which the first virtual object is sliding forward in the virtual environment in a tilted crouching position.

The receiving module 1620 is further configured to receive an attack operation while the first virtual object is in the sliding tackle state.

The control module 1630 is configured to control the first virtual object to perform a close-in attack by using the first prop in the sliding tackle state.

In some embodiments, the receiving module 1620 is further configured to receive a running state trigger operation, the running state trigger operation being used for controlling the first virtual object to be in a running state continuously.

The receiving module 1620 is further configured to receive a jump trigger operation in a running process of the first virtual object, the jump trigger operation being used for controlling the first virtual object to jump in the virtual environment.

The receiving module 1620 is further configured to receive a crouch trigger operation as a sliding tackle state trigger operation during a jump process of the first virtual object, the crouch trigger operation being used for controlling the first virtual object to crouch in the virtual environment;

In some embodiments, the jump process includes a takeoff stage, a falling stage and a landing stage.

The receiving module 1620 is configured to receive the crouch trigger operation as the sliding tackle state trigger operation during the landing stage in the jump process.

In some embodiments, the virtual environment further includes a second virtual object.

The control module 1630 is further configured to control the first virtual object to perform a display action in the virtual environment in response to a successful attack made by the first virtual object on the second virtual object by using the first prop, the display action being used for representing a result of the attack made by the first virtual object on the second virtual object.

In some embodiments, the control module 1630 is further configured to control the first virtual object to perform the display action in the virtual environment in response to the first virtual object generating a damage value to the second virtual object by using the first prop;

or the control module 1630 is further configured to control the first virtual object to perform the display action in the virtual environment in response to the first virtual object eliminating the second virtual object by using the first prop.

Figure 17:
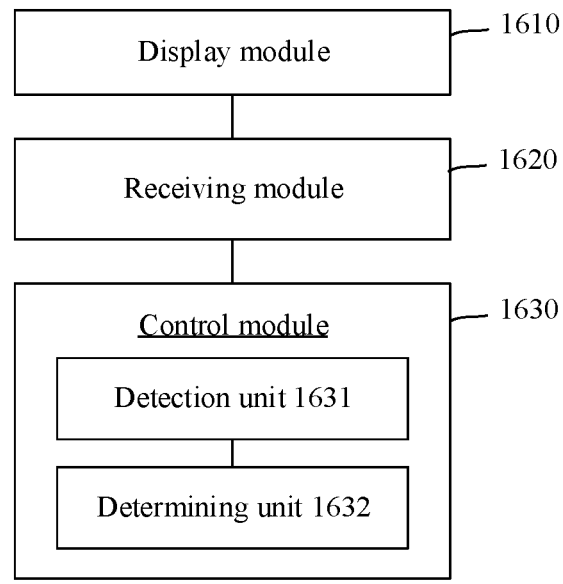
FIG. 17 is a structural block diagram of an apparatus for operating a virtual prop in a virtual environment according to another exemplary embodiment of this application.

In some embodiments, the first prop is mounted with a collision detection box;

As shown in FIG. 17, the controlling module 1630 includes:

a detection unit 1631, configured to perform a collision detection between the first prop and the second virtual object by using the collision detection box;

a determining unit 1632, configured to determine, in response to the existence of a collision between the collision detection box and the second virtual object, that the first prop causes the damage value to the second virtual object.

In some embodiments, the display module 1610 is further configured to display a prop assembly interface, the prop assembly interface including candidate props, the candidate props including the first prop and the second prop, the second prop being a default prop assembled for the first virtual object, the first prop having a larger attack range than that of the second prop.

The receiving module 1620 is further configured to receive an assembly operation for the first prop on the prop assembly interface, the assembly operation being used for assembling the first prop for the first virtual object.

In conclusion, in the apparatus for operating a virtual prop in a virtual environment provided by this embodiment, when the first prop is applied, first, the first virtual object is controlled to be in a sliding tackle state and makes an attack with the first prop in the sliding tackle state. Because the body position of the first virtual object in the sliding tackle state is relatively close to the ground compared with the body position in a normal standing or walking state, when the first prop is swung, the height of a swing path of the first prop is more consistent with the height of the virtual object, and other virtual objects cannot directly evade the attack of the first prop, which improves the attack efficiency of the first virtual object using the first prop, thus improving the human-computer interaction efficiency of the first virtual object during the attack with the first prop.

The apparatus for operating a virtual prop in a virtual environment provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the apparatus for operating a virtual prop in a virtual environment provided in the foregoing embodiment belongs to the same concept as the method for operating a virtual prop in a virtual environment. For a specific implementation process of the apparatus, refer to the method embodiment. Details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 18:
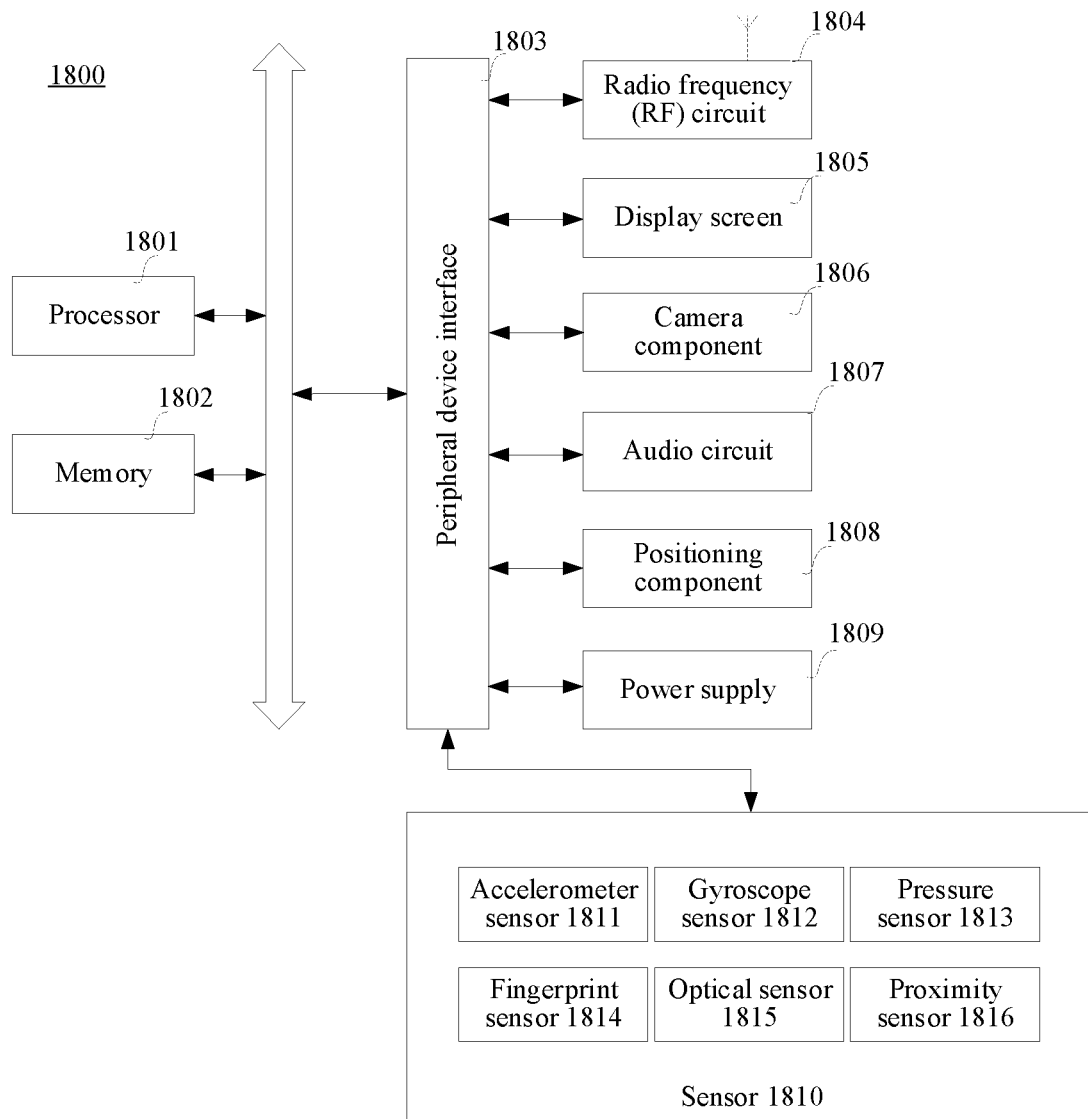
FIG. 18 is a structural block diagram of a terminal according to an exemplary embodiment of this application.

FIG. 18 is a structural block diagram of a terminal 1800 according to an exemplary embodiment of this application. The terminal 1800 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1800 may also be referred to as a user device, a portable terminal, a laptop terminal, a desktop terminal, or the like.

Generally, the terminal 1800 includes a processor 1801 and a memory 1802.

The processor 1801 may include one or more processing cores, for example, a 4-core processor or an 8-core processor. The processor 1801 may be implemented by using at least one hardware form of a digital signal processor (DSP), a field programmable gate array (FPGA), and a programmable logic array (PLA). The processor 1801 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 1801 may be integrated with a graphics processing unit (GPU). The GPU is configured to be responsible for rendering and drawing content that a display needs to display. In some embodiments, the processor 1801 may further include an artificial intelligence (AI) processor. The AI processor is configured to process a computing operation related to machine learning.

The memory 1802 may include one or more computer-readable storage media. The computer-readable storage media may be non-transient. The memory 1802 may further include a high-speed random access memory, and a non-volatile memory such as one or more magnetic disk storage devices and a flash memory device. In some embodiments, the non-transient computer-readable storage medium in the memory 1802 is configured to store at least one instruction, and the at least one instruction is configured to be executed by the processor 1801 to implement the method for operating a virtual prop in a virtual environment provided in the method embodiments of this application.

In some embodiments, the terminal 1800 may include: a peripheral device interface 1803 and at least one peripheral device. The processor 1801, the memory 1802, and the peripheral device interface 1803 may be connected through a bus or a signal cable. Each peripheral device may be connected to the peripheral device interface 1803 through a bus, a signal cable, or a circuit board. Specifically, the peripheral device includes at least one of a radio frequency (RF) circuit 1804, a display screen 1805, a camera component 1806, an audio circuit 1807, a positioning component 1808, and a power supply 1809.

The peripheral device interface 1803 may be configured to connect at least one input/output (I/O)-related peripheral device to the processor 1801 and the memory 1802. In some embodiments, the processor 1801, the memory 1802, and the peripheral device interface 1803 are integrated into the same chip or circuit board. In some other embodiments, any one or two of the processor 1801, the memory 1802, and the peripheral device interface 1803 may be implemented on an independent chip or circuit board, and the implementation is not limited in this embodiment.

The RF circuit 1804 is configured to receive and transmit a radio frequency (RF) signal, also referred to as an electromagnetic signal. The RF circuit 1804 communicates with a communication network and other communication devices through the electromagnetic signal. The RF circuit 1804 may convert an electric signal into an electromagnetic signal for transmission, or convert a received electromagnetic signal into an electric signal. In some embodiments, the RF circuit 1804 includes an antenna system, an RF transceiver, one or more amplifiers, a tuner, an oscillator, a digital signal processor, a codec chip set, a subscriber identity module card, and the like. The RF circuit 1804 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1804 may also include a circuit related to near field communication (NFC). This is not limited in this application.

The display screen 1805 is configured to display a user interface (UI). The UI may include a graph, a text, an icon, a video, and any combination thereof. When the display screen 1805 is a touch display screen, the display screen 1805 is further capable of collecting touch signals on or above a surface of the display screen 1805. The touch signal may be inputted, as a control signal, to the processor 1801 for processing. In this case, the display screen 1805 may be further configured to provide a virtual button and/or a virtual keyboard that are/is also referred to as a soft button and/or a soft keyboard. In some embodiments, there may be one display screen 1805 disposed on a front panel of the terminal 1800. In some other embodiments, there may be at least two display screens 1805 respectively disposed on different surfaces of the terminal 1800 or designed in a foldable shape. In still some other embodiments, the display screen 1805 may be a flexible display screen, disposed on a curved surface or a folded surface of the terminal 1800. Even, the display screen 1805 may be further set in a non-rectangular irregular pattern, that is, a special-shaped screen. The display screen 1805 may be manufactured by using a material such as a liquid crystal display (LCD), an organic light-emitting diode (OLED), or the like.

The camera component 1806 is configured to collect an image or a video. In some embodiments, the camera component 1806 includes a front-facing camera and a rear-facing camera. Generally, the front-facing camera is disposed on a front panel of the terminal, and the rear-facing camera is disposed on a rear surface of the terminal. In some embodiments, there are at least two rear-facing cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1806 may further include a flashlight. The flash may be a single-color-temperature flash, or may be a double-color-temperature flash. The double-color-temperature flash refers to a combination of a warm-light flash and a cold-light flash, and may be used for light compensation under different color temperatures.

The audio circuit 1807 may include a microphone and a speaker. The speaker is configured to collect sound waves of a user and an environment, and convert the sound waves into electric signals and input the electrical signals into the processor 1801 for processing, or input the electrical signals into the RF circuit 1804 to implement speech communication. For the purpose of stereo sound collection or noise reduction, there may be a plurality of microphones, respectively disposed at different parts of the terminal 1800. The microphone may be further a microphone array or an omnidirectional collection microphone. The speaker is configured to convert electric signals from the processor 1801 or the RF circuit 1804 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1807 may also include an earphone jack.

The positioning component 1808 is configured to position a current geographic location of the terminal 1800, to implement a navigation or a location based service (LBS). The positioning component 1808 may be a positioning component based on the Global Positioning System (GPS) of the United States, the BeiDou system of China, or the GALILEO System of the European Union.

The power supply 1809 is configured to supply power to components in the terminal 1800. The power supply 1809 may be an alternating-current power supply, a direct-current power supply, a disposable battery, or a rechargeable battery. When the power supply 1809 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 1800 further includes one or more sensors 1810. The one or more sensors 1810 include, but are not limited to, an acceleration sensor 1811, a gyroscope sensor 1812, a pressure sensor 1813, a fingerprint sensor 1814, an optical sensor 1815, and a proximity sensor 1816.

The acceleration sensor 1811 may detect acceleration on three coordinate axes of a coordinate system established by the terminal 1800. For example, the acceleration sensor 1811 may be configured to detect components of gravity acceleration on the three coordinate axes. The processor 1801 may control, according to a gravity acceleration signal acquired by the acceleration sensor 1811, the display screen 1805 to display the user interface in a frame view or a portrait view. The acceleration sensor 1811 may be further configured to acquire motion data of a game or a user.

The gyroscope sensor 1812 may detect a body direction and a rotation angle of the terminal 1800. The gyroscope sensor 1812 may cooperate with the acceleration sensor 1811 to acquire a 3D action by the user on the terminal 1800. The processor 1801 may implement the following functions according to the data acquired by the gyroscope sensor 1812: motion sensing (such as changing the UI according to a tilt operation of the user), image stabilization at shooting, game control, and inertial navigation.

The pressure sensor 1813 may be disposed at a side frame of the terminal 1800 and/or a lower layer of the display screen 1805. When the pressure sensor 1813 is disposed at the side frame of the terminal 1800, a holding signal of the user on the terminal 1800 may be detected. The processor 1801 performs left and right hand recognition or a quick operation according to the holding signal acquired by the pressure sensor 1813. When the pressure sensor 1813 is disposed on the low layer of the display screen 1805, the processor 1801 controls, according to a pressure operation of the user on the display screen 1805, an operable control on the UI. The operable control includes at least one of a button control, a scroll-bar control, an icon control, and a menu control.

The fingerprint sensor 1814 is configured to collect a fingerprint of the user. The processor 1801 identifies an identity of the user according to the fingerprint collected by the fingerprint sensor 1814, or the fingerprint sensor 1814 identifies an identity of the user according to the collected fingerprint. When the identity of the user is recognized as credible, the processor 1801 authorizes the user to perform a related sensitive operation. The sensitive operation includes unlocking a screen, viewing encrypted information, downloading software, paying, changing a setting, and the like. The fingerprint sensor 1814 may be disposed on a front surface, a back surface, or a side surface of the terminal 1800. When a physical button or a vendor logo is disposed on the terminal 1800, the fingerprint sensor 1814 may be integrated with the physical button or the vendor logo.

The optical sensor 1815 is configured to acquire ambient light intensity. In an embodiment, the processor 1801 may control display luminance of the display screen 1805 according to the ambient light intensity collected by the optical sensor 1815. Specifically, when the ambient light intensity is relatively high, the display luminance of the display screen 1805 is increased. When the ambient light intensity is relatively low, the display luminance of the display screen 1805 is reduced. In another embodiment, the processor 1801 may further dynamically adjust shooting parameters of the camera component 1806 according to the ambient light intensity collected by the optical sensor 1815.

The proximity sensor 1816, also referred to as a distance sensor, is generally disposed on the front panel of the terminal 1800. The proximity sensor 1816 is configured to collect a distance between the user and the front face of the terminal 1800. In an embodiment, when the proximity sensor 1816 detects that the distance between the user and the front surface of the terminal 1800 gradually becomes smaller, the touch display screen 1805 is controlled by the processor 1801 to switch from a screen-on state to a screen-off state; and when the proximity sensor 1816 detects that the distance between the user and the front surface of the terminal 1800 gradually becomes larger, the touch display screen 1805 is controlled by the processor 1801 to switch from the screen-off state to the screen-on state.

A person skilled in the art may understand that a structure shown in FIG. 18 constitutes no limitation on the terminal 1800, and the terminal may include more or fewer components than those shown in the figure, or some components may be combined, or a different component deployment may be used.

An embodiment of this application further provides a computer device. The computer device includes a memory and a processor, the memory storing at least one instruction, at least one program, a code set, or an instruction set, the at least one instruction, the at least one program, the code set, or the instruction set being loaded and executed by the processor, to implement the method for operating a virtual prop in a virtual environment according to any one of the foregoing embodiments.

An embodiment of this application further provides a computer-readable storage medium, the readable storage medium storing at least one instruction, at least one program, a code set, or an instruction set, the at least one instruction, the at least one program, the code set or the instruction set being loaded and executed by a processor to implement the method for operating a virtual prop in a virtual environment according to any one of the foregoing embodiments.

A computer program product is also provided, the computer program product, when run on a computer, causing the computer to perform the method for operating a virtual prop in a virtual environment according to any one of the foregoing embodiments.

A person of ordinary skill in the art may understand that all or some of the steps of the methods in the foregoing embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not installed in a terminal. The computer-readable storage medium stores at least one instruction, at least one program, and a code set or an instruction set, the at least one instruction, the at least one program, and the code set or the instruction set being loaded and executed by a processor to implement the method for operating a virtual prop in a virtual environment according to the any one of the foregoing embodiments.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purpose, and are not intended to indicate the preference among the embodiments.

A person of ordinary skill in the art may understand that all or some of the steps in the embodiments may be implemented by hardware or a program instructing relevant hardware. The program may be stored in a computer-readable storage medium. The storage medium may be: a ROM, a magnetic disk, or an optical disc, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. A method for operating a virtual prop in a virtual environment performed by a computer device, the method comprising:
    displaying a virtual environment interface, the virtual environment interface comprising a picture of the virtual environment observed by a first virtual object, the first virtual object being equipped with a first prop and controlled by a user of the computer device;
    in response to a predefined trigger operation on the first virtual object by the user of the computer device, controlling the first virtual object to perform an attack on a second virtual object in the virtual environment by using the first prop, further including:
        controlling the first virtual object to slide forward in the virtual environment in a tilted crouching position;
        receiving an attack operation on the second virtual object while the first virtual object slides forward; and
        performing a predefined attack on the second virtual object using the first prop according to the attack operation; and
    in response to successful execution of the attack on the second virtual object, controlling the first virtual object to perform a display action in the virtual environment, the display action representing a result of the attack on the second virtual object; and
    in response to the display action, displaying a change of the first prop from its current position to a new position in the virtual environment.

2. The method according to claim 1, wherein the predefined trigger operation comprises at least one or more of:
- a running state trigger operation for controlling the first virtual object to run continuously;
- a jump trigger operation for controlling the first virtual object to jump in the virtual environment while in a running process; and
- a crouch trigger operation for controlling the first virtual object to crouch in the virtual environment while in a jump process.

3. The method according to claim 1, wherein the controlling the first virtual object to perform a display action in the virtual environment comprises:
- controlling the first virtual object to perform the display action in the virtual environment in response to the first virtual object generating a damage value to the second virtual object or eliminating the second virtual object by using the first prop.

4. The method according to claim 3, wherein the first prop is mounted with a collision detection box; and the controlling the first virtual object to perform an attack on a second virtual object in the virtual environment by using the first prop comprises:
- performing a collision detection between the first prop and the second virtual object by using the collision detection box; and
- determining the successful execution of the attack on the second virtual object in response to a collision between the collision detection box and the second virtual object.

5. The method according to claim 1, before the displaying a virtual environment interface, the method further comprising:
- displaying a prop assembly interface, the prop assembly interface comprising candidate props, the candidate props comprising the first prop and a second prop, the second prop being a default prop assembled for the first virtual object, the first prop having a larger attack range than that of the second prop; and
- receiving, on the prop assembly interface, an assembly operation for the first prop, the assembly operation being used for assembling the first prop for the first virtual object.

6. A computer device, comprising a processor and a memory, the memory storing at least one program, wherein the at least one program, when executed by the processor, causes the computer device to perform a method for operating a virtual prop in a virtual environment including:
- displaying a virtual environment interface, the virtual environment interface comprising a picture of the virtual environment observed by a first virtual object, the first virtual object being equipped with a first prop and controlled by a user of the computer device;
- in response to a predefined trigger operation on the first virtual object by the user of the computer device, controlling the first virtual object to perform an attack on a second virtual object in the virtual environment by using the first prop, further including:
  - controlling the first virtual object to slide forward in the virtual environment in a tilted crouching position;
  - receiving an attack operation on the second virtual object while the first virtual object slides forward; and
  - performing a predefined attack on the second virtual object using the first prop according to the attack operation; and
- in response to successful execution of the attack on the second virtual object, controlling the first virtual object to perform a display action in the virtual environment, the display action representing a result of the attack on the second virtual object; and
- in response to the display action, displaying a change of the first prop from its current position to a new position in the virtual environment.

7. The computer device according to claim 6, wherein the predefined trigger operation comprises at least one or more of:
- a running state trigger operation for controlling the first virtual object to run continuously;
- a jump trigger operation for controlling the first virtual object to jump in the virtual environment while in a running process; and
- a crouch trigger operation for controlling the first virtual object to crouch in the virtual environment while in a jump process.

8. The computer device according to claim 6, wherein the controlling the first virtual object to perform a display action in the virtual environment comprises:
- controlling the first virtual object to perform the display action in the virtual environment in response to the first virtual object generating a damage value to the second virtual object or eliminating the second virtual object by using the first prop.

9. The computer device according to claim 8, wherein the first prop is mounted with a collision detection box; and the controlling the first virtual object to perform an attack on a second virtual object in the virtual environment by using the first prop comprises:
- performing a collision detection between the first prop and the second virtual object by using the collision detection box; and
- determining the successful execution of the attack on the second virtual object in response to a collision between the collision detection box and the second virtual object.

10. The computer device according to claim 6, wherein, before the displaying a virtual environment interface, the method further comprises:
- displaying a prop assembly interface, the prop assembly interface comprising candidate props, the candidate props comprising the first prop and a second prop, the second prop being a default prop assembled for the first virtual object, the first prop having a larger attack range than that of the second prop; and
- receiving, on the prop assembly interface, an assembly operation for the first prop, the assembly operation being used for assembling the first prop for the first virtual object.

11. A non-transitory computer-readable storage medium, storing at least one program, wherein the at least one program, when executed by a processor of a computer device, causes the computer device to perform a method for operating a virtual prop in a virtual environment including:
- displaying a virtual environment interface, the virtual environment interface comprising a picture of the virtual environment observed by a first virtual object, the first virtual object being equipped with a first prop;
- in response to a predefined trigger operation on the first virtual object, controlling the first virtual object to perform an attack on a second virtual object in the virtual environment by using the first prop; and
- in response to successful execution of the close-in attack on the second virtual object, controlling the first virtual object to perform a display action in the virtual environment, the display action representing a result of the attack on the second virtual object;

displaying a virtual environment interface, the virtual environment interface comprising a picture of the virtual environment observed by a first virtual object, the first virtual object being equipped with a first prop and controlled by a user of the computer device;

in response to a predefined trigger operation on the first virtual object by the user of the computer device, controlling the first virtual object to perform an attack on a second virtual object in the virtual environment by using the first prop, further including:

controlling the first virtual object to slide forward in the virtual environment in a tilted crouching position;

receiving an attack operation on the second virtual object while the first virtual object slides forward; and performing a predefined attack on the second virtual object using the first prop according to the attack operation; and in response to successful execution of the attack on the second virtual object, controlling the first virtual object to perform a display action in the virtual environment, the display action representing a result of the attack on the second virtual object; and in response to the display action, displaying a change of the first prop from its current position to a new position in the virtual environment.

12. The non-transitory computer-readable storage medium according to claim 11, wherein the predefined trigger operation comprises at least one or more of:

a running state trigger operation for controlling the first virtual object to run continuously;

a jump trigger operation for controlling the first virtual object to jump in the virtual environment while in a running process; and a crouch trigger operation for controlling the first virtual object to crouch in the virtual environment while in a jump process.

13. The non-transitory computer-readable storage medium according to claim 11, wherein the controlling the first virtual object to perform a display action in the virtual environment comprises:

controlling the first virtual object to perform the display action in the virtual environment in response to the first virtual object generating a damage value to the second virtual object or eliminating the second virtual object by using the first prop.

14. The non-transitory computer-readable storage medium according to claim 13, wherein the first prop is mounted with a collision detection box; and the controlling the first virtual object to perform an attack on a second virtual object in the virtual environment by using the first prop comprises:

performing a collision detection between the first prop and the second virtual object by using the collision detection box; and determining the successful execution of the attack on the second virtual object in response to a collision between the collision detection box and the second virtual object.

* * * * *